(12) United States Patent
Tanaka et al.

(10) Patent No.: US 11,841,421 B2
(45) Date of Patent: Dec. 12, 2023

(54) SYNTHETIC APERTURE RADAR IMAGE ANALYSIS SYSTEM, SYNTHETIC APERTURE RADAR IMAGE ANALYSIS METHOD, AND SYNTHETIC APERTURE RADAR IMAGE ANALYSIS PROGRAM

(71) Applicant: NEC Corporation, Tokyo (JP)

(72) Inventors: Taichi Tanaka, Tokyo (JP); Daisuke Ikefuji, Tokyo (JP); Osamu Hoshuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 133 days.

(21) Appl. No.: 17/053,211

(22) PCT Filed: May 8, 2018

(86) PCT No.: PCT/JP2018/017798
§ 371 (c)(1),
(2) Date: Nov. 5, 2020

(87) PCT Pub. No.: WO2019/215819
PCT Pub. Date: Nov. 14, 2019

(65) Prior Publication Data
US 2021/0132214 A1 May 6, 2021

(51) Int. Cl.
*G01S 13/90* (2006.01)
*G01S 7/04* (2006.01)

(52) U.S. Cl.
CPC .......... *G01S 13/9005* (2013.01); *G01S 7/046* (2013.01); *G01S 13/9027* (2019.05); *G01S 13/9056* (2019.05)

(58) Field of Classification Search
CPC .. G01S 13/9005; G01S 7/046; G01S 13/9027; G01S 13/9056
See application file for complete search history.

(56) References Cited

U.S. PATENT DOCUMENTS 6,583,751 B1    6/2003 Ferretti et al.
6,587,601 B1    7/2003 Hsu et al.
(Continued)

FOREIGN PATENT DOCUMENTS

JP    2003-331289 A    11/2003
JP    1010-281617 A    12/2010
(Continued)

OTHER PUBLICATIONS

Japanese Office Action for JP Application No. 2020-517660 dated Jul. 27, 2021 with English Translation.
(Continued)

*Primary Examiner* — Peter M Bythrow
*Assistant Examiner* — Nazra Nur Waheed
(74) *Attorney, Agent, or Firm* — Sughrue Mion, PLLC.

(57) ABSTRACT

A synthetic aperture radar image analysis system 20 includes: a phase correlation determination means 21 which determines a strength of the phase correlation between a plurality of pixels in an image selected from among a plurality of images on the basis of the plurality of images that have been photographed by a synthetic aperture radar and show the same point; a shape determination means 22 which determines a degree of similarity between the shape of the distribution of the plurality of pixels and an object shape indicated by geospatial information; and an association means 23 which associates the plurality of pixels with the object on the basis of the determined strength of the phase correlation and the determined degree of similarity.

20 Claims, 25 Drawing Sheets

(56) References Cited

U.S. PATENT DOCUMENTS

| | | | | |
|---|---|---|---|---|
| 8,155,452 B2* | 4/2012 | Minear | ................... | G06T 7/32 |
| | | | | 382/209 |
| 8,588,547 B2* | 11/2013 | Giuffrida | ................ | G06T 11/60 |
| | | | | 382/199 |
| 8,798,148 B2* | 8/2014 | Kostrzewski | ........ | H04N 19/136 |
| | | | | 375/240.15 |
| 9,389,311 B1* | 7/2016 | Moya | ................... | G06V 20/13 |
| 2009/0002224 A1* | 1/2009 | Khatib | ................ | G01S 13/9027 |
| | | | | 342/25 R |
| 2013/0004017 A1 | 1/2013 | Medasani et al. | | |

FOREIGN PATENT DOCUMENTS

| | | |
|---|---|---|
| JP | 4702122 B2 | 6/2011 |
| JP | 4861555 B2 | 1/2012 |
| JP | 2013-101428 A | 5/2013 |
| JP | 2015-114147 A | 6/2015 |
| JP | 2016-188789 A | 11/2016 |
| JP | 2017-072473 A | 4/2017 |
| JP | 2018048898 A * | 3/2018 |

OTHER PUBLICATIONS

International Search Report for PCT Application No. PCT/JP2018/017798, dated Aug. 7, 2018.

T. Tanaka, and O. Hoshuyama, "Persistent Scatterer Clustering for Structure Displacement Analysis Based on Phase Correlation Network" in Proc. IEEE IGARSS2017, Jul. 2017, USA.

* cited by examiner

FIG. 3

| SAR IMAGE ID | REFERENCE IMAGE FLAG | SAR PIXEL ID | POSITION | LUMINANCE | PHASE | |
|---|---|---|---|---|---|---|
| A001 | TRUE | A001-0001 | | | | |
| | | A001-0002 | | | | |
| | | | | | | |
| A002 | FALSE | A002-0001 | | | | |
| | | | | | | |
| A003 | FALSE | | | | | |
| ⋮ | | ⋮ | ⋮ | ⋮ | ⋮ | |

FIG. 4

| SAR PIXEL ID | POSITION | PHASE SEQUENCE | | | |
|---|---|---|---|---|---|
| | | A001 | A002 | A003 | ... |
| A001-0001 | | | | | |
| A001-0002 | | | | | |
| ⋮ | ⋮ | ⋮ | ⋮ | ⋮ | ⋮ |

FIG. 5

| OBJECT ID | POSITION | SHAPE | ... |
|---|---|---|---|
| OBJ0001 | | | |
| OBJ0002 | | | |
| OBJ0003 | | | |
| ⋮ | ⋮ | ⋮ | |

| IMAGE INDICATING SHAPE OF ROAD | IMAGE INDICATING SHAPE OF BUILDING |

FIG. 8
IMAGE INDICATING SAR PIXEL GROUP A
IMAGE INDICATING SAR PIXEL GROUP B
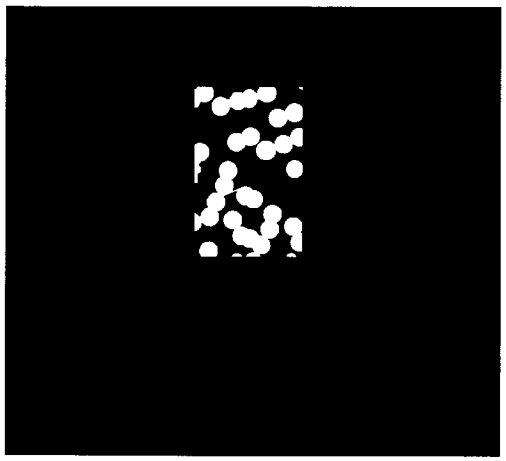
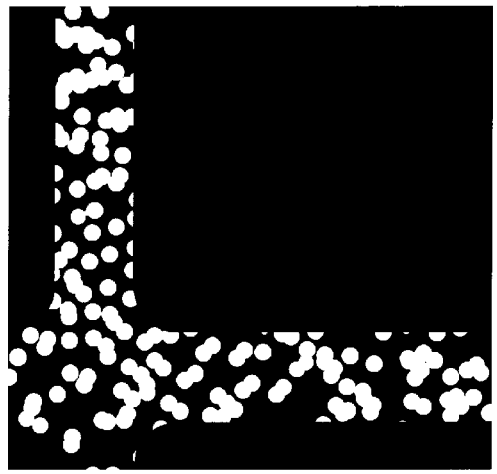
FIG. 9
| OBJECT ID | SAR PIXEL GROUP ID | SAR PIXEL ID |
|---|---|---|
| OBJ0001 | S0001 | A001-0001 |
| | | A001-0002 |
| | S0002 | A001-0003 |
| OBJ0002 | S0003 | A001-0004 |
| | | A001-0005 |
| OBJ0003 | S0004 | A002-0006 |
| ⋮ | ⋮ | ⋮ |

| OBJECT ID | INFORMATION | | |
|---|---|---|---|
| | DISPLACEMENT | ELEVATION | ... |
| OBJ0001 | | | |
| OBJ0002 | | | |
| OBJ0003 | | | |
| ⋮ | ⋮ | ⋮ | ⋮ |

| SAR PIXEL ID | STABLE REFLECTION POINT FLAG | POSITION | PHASE SEQUENCE | | | LUMINANCE SEQUENCE | | |
|---|---|---|---|---|---|---|---|---|
| | | | A001 | A002 | ... | A001 | A002 | ... |
| A001-0001 | TRUE | | | | | | | |
| A001-0002 | FALSE | | | | | | | |
| ⋮ | | | ⋮ | ⋮ | ⋮ | ⋮ | ⋮ | |

FIG. 28
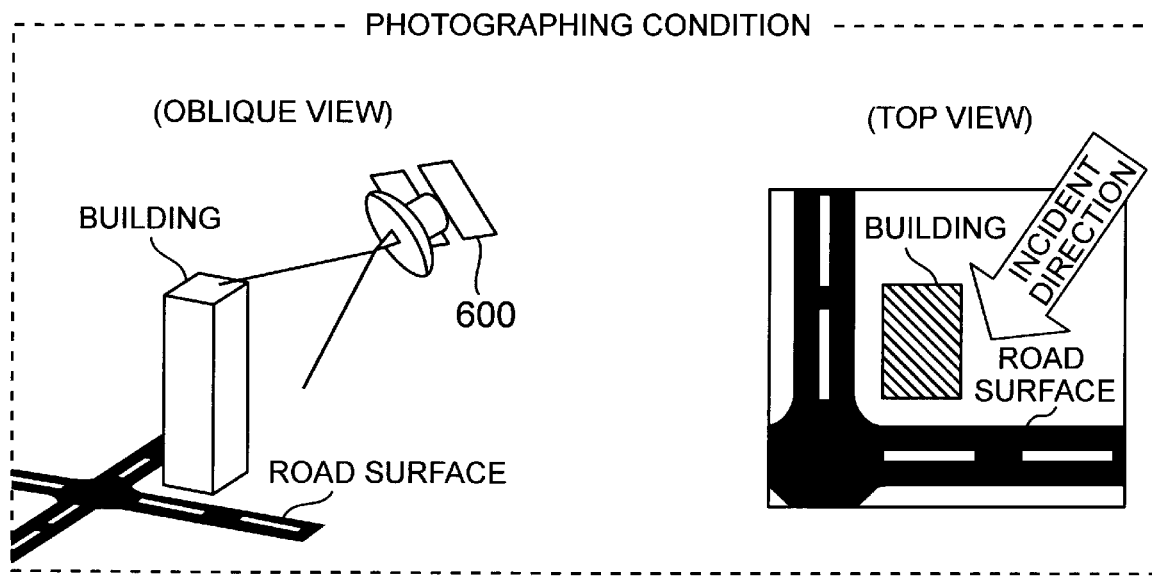
FIG. 29
ESTIMATED VALUE OF REFLECTION
CHARACTERISTIC OF ROAD
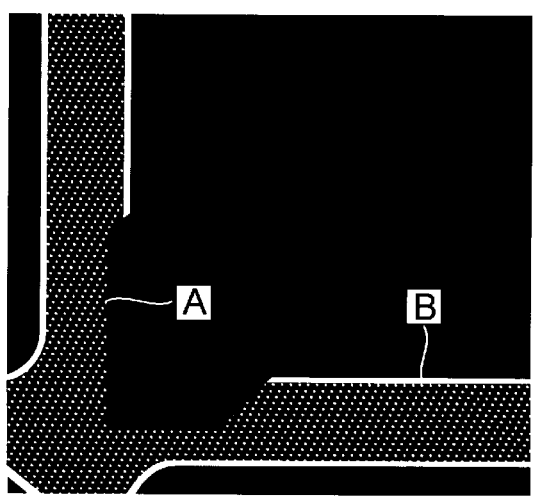
ESTIMATED VALUE OF REFLECTION
CHARACTERISTIC OF BUILDING
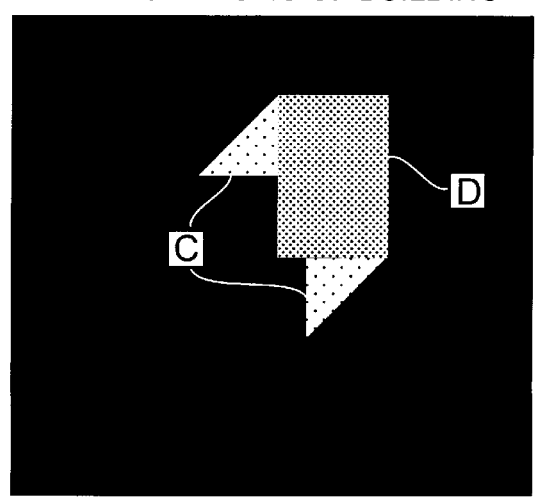

SYNTHETIC APERTURE RADAR IMAGE ANALYSIS SYSTEM, SYNTHETIC APERTURE RADAR IMAGE ANALYSIS METHOD, AND SYNTHETIC APERTURE RADAR IMAGE ANALYSIS PROGRAM

This application is a National Stage Entry of PCT/JP2018/017798 filed on May 8, 2018, the contents of all of which are incorporated herein by reference, in their entirety.

TECHNICAL FIELD

The present invention relates to a synthetic aperture radar (SAR: Synthetic Aperture Radar) image analysis system, a synthetic aperture radar image analysis method, and a synthetic aperture radar image analysis program, and particularly to a synthetic aperture radar image analysis system, a synthetic aperture radar image analysis method, and a synthetic aperture radar image analysis program that integrate a SAR image and geospatial information to analyze the SAR image.

BACKGROUND ART

The technology for observing the state of the ground surface from the sky far from the ground is becoming widespread. For example, synthetic aperture radar is a technology that obliquely irradiates electromagnetic waves from the sky to the ground by satellites and airplanes, and observes the state of the ground surface by imaging reflected waves from the ground surface against the electromagnetic waves. A SAR image, which is an image photographed by a synthetic aperture radar, is an image in which reflection characteristics for electromagnetic waves are recorded.

The intensity of the electromagnetic waves reflected from the object existing on the ground is imaged on the basis of the distance between the object and the satellite. In other words, the position where the reflected wave from the object is displayed is deviated from the position of the object according to the height of the object.

The above mechanism causes the SAR image to distort the geographical space in comparison with an image in which the state of the ground surface is displayed according to geographical coordinates. Therefore, the SAR image is unlikely to be associated with geospatial information other than geospatial information relating to the SAR image itself.

Patent Literature (PTL) 1 describes an ortho-correction apparatus for a synthetic aperture radar image which performs a correction process called ortho-correction in order to correct distortion of a geographical space in a SAR image.

PTL 2 describes a method for determining a measurement procedure for measuring ground movement in an urban area and a landslide area by a more reliable method.

CITATION LIST

Patent Literature

PTL 1: Japanese Patent No. 4702122
PTL 2: Japanese Patent No. 4861555

Non Patent Literature

NPL 1: T. Tanaka, and O. Hoshuyama, "Persistent Scatterer Clustering for Structure Displacement Analysis Based on Phase Correlation Network," in ProcIEEE IGARSS2017, July 2017.

SUMMARY OF INVENTION

Technical Problem

The ortho-correction apparatus described in PTL 1 can roughly correct the distortion of the geographical space in the SAR image using known elevation data (DEM: Digital Elevation Model).

However, even if the ortho-correction apparatus described in PTL 1 is used, information regarding the reflection of electromagnetic waves of each object recorded in geospatial information such as a map is required to be manually acquired from the SAR image. In other words, the operation of acquiring information about the reflection of the electromagnetic waves of each object is complicated.

In addition, when the ortho-correction apparatus described in PTL 1 is used, distortion due to, for example, DEM errors may remain in the SAR image. In particular, there is a high possibility that a large distortion relating to, for example, a building not normally recorded in a DEM will remain in the SAR image.

For the above reason, even after the ortho-correction process by the ortho-correction apparatus described in PTL 1 is executed, associating the SAR image with the geospatial information by simply superimposing the SAR image and the geospatial information is difficult.

Further, even in the method described in PTL 2, associating the SAR image with the geospatial information is not assumed.

PURPOSE OF INVENTION

Accordingly, it is an object of the present invention to provide a synthetic aperture radar image analysis system, a synthetic aperture radar image analysis method, and a synthetic aperture radar image analysis program that solve the above problems and can easily associate pixels of a SAR image with an object indicated by geospatial information.

Solution to Problem

The synthetic aperture radar image analysis system according to the present invention includes: a phase correlation determination means which determines a strength of the phase correlation between a plurality of pixels in an image selected from among a plurality of images on the basis of the plurality of images that have been photographed by a synthetic aperture radar and show the same point; a shape determination means which determines a degree of similarity between the shape of the distribution of the plurality of pixels and an object shape indicated by geospatial information; and an association means which associates the plurality of pixels with the object on the basis of the determined strength of the phase correlation and the determined degree of similarity.

The synthetic aperture radar image analysis method includes: determining a strength of the phase correlation between a plurality of pixels in an image selected from among a plurality of images on the basis of the plurality of images that have been photographed by a synthetic aperture radar and show the same point; determining a degree of similarity between the shape of the distribution of the plurality of pixels and an object shape indicated by geospatial information; and associating the plurality of pixels with the object on the basis of the determined strength of the phase correlation and the determined degree of similarity.

The synthetic aperture radar image analysis program causes a computer to execute: a phase correlation determination process of determining a strength of the phase correlation between a plurality of pixels in an image selected from among a plurality of images on the basis of the plurality of images that have been photographed by a synthetic aperture radar and show the same point; a shape determination process of determining a degree of similarity between the shape of the distribution of the plurality of pixels and an object shape indicated by geospatial information; and an association process of associating the plurality of pixels with the object on the basis of the determined strength of the phase correlation and the determined degree of similarity.

Advantageous Effects of Invention

The present invention can easily associate the pixels of the SAR image with the object indicated by the geospatial information.

BRIEF DESCRIPTION OF DRAWINGS

FIG. 3 is an explanatory diagram showing an example of SAR image information outputted by a SAR image shaping unit 110.

FIG. 4 is an explanatory diagram showing an example of SAR pixel information outputted by the SAR image shaping unit 110.

FIG. 5 is an explanatory diagram showing an example of geospatial information outputted by a geospatial information shaping unit 120.

FIG. 8 is an explanatory diagram showing an example of an image indicating the shape of the distribution of a SAR pixel group generated by the shape determination unit 150.

FIG. 9 is an explanatory diagram showing an example of object-SAR pixel correspondence information outputted by a pixel classification unit 130.

FIG. 28 is an explanatory diagram showing an example of a photographing condition inputted from a SAR image photographing condition input unit 210.

FIG. 29 is an explanatory diagram showing an example of the estimated value of the reflection characteristic outputted by a reflection characteristic estimation unit 220.

DESCRIPTION OF EMBODIMENTS

First Exemplary Embodiment

[Description of Configuration]

Figure 1:
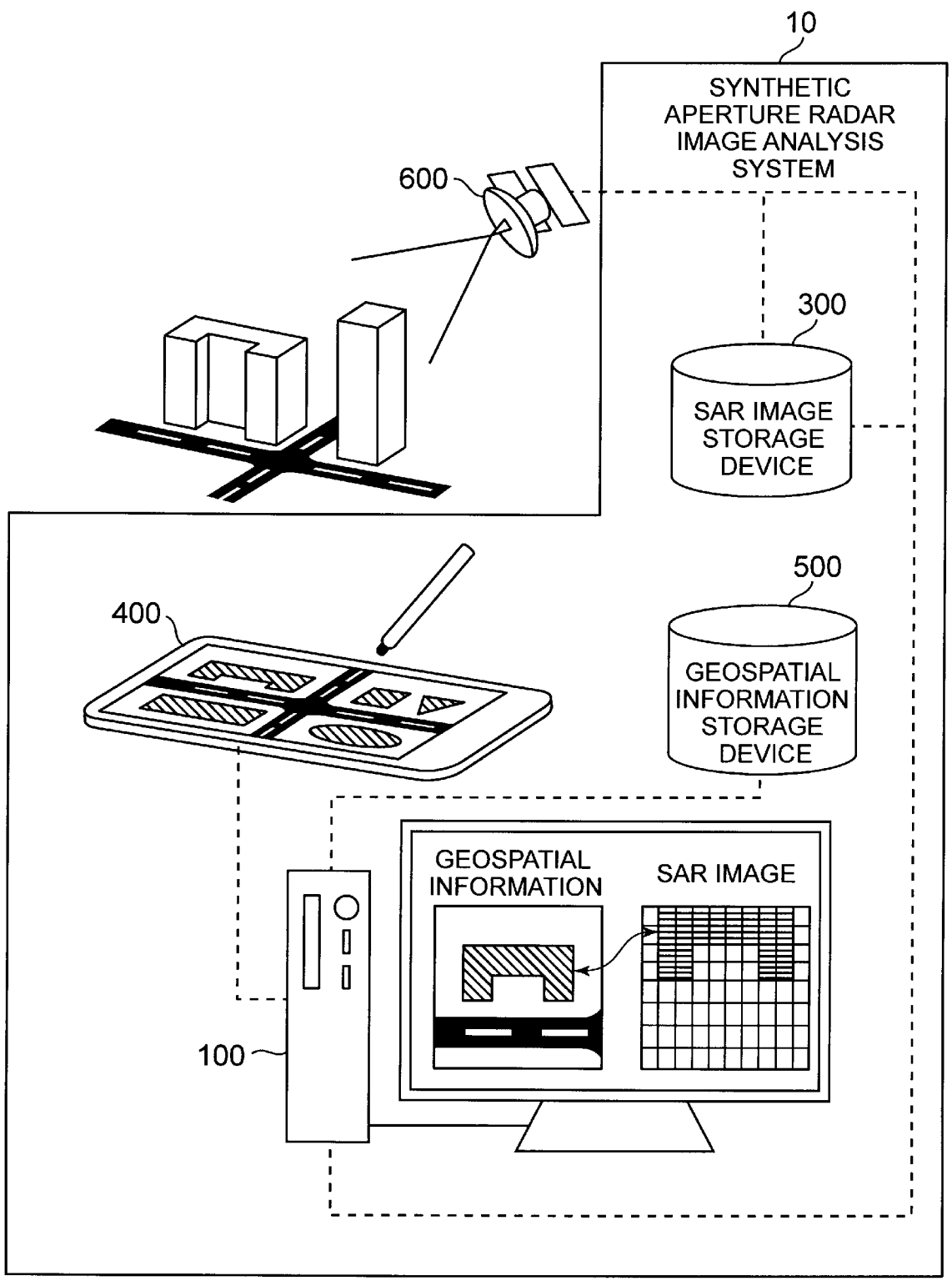
FIG. 1 is an explanatory diagram showing an example of a first exemplary embodiment of a synthetic aperture radar image analysis system according to the present invention.

Exemplary embodiments of the present invention will now be described with reference to the drawings. FIG. 1 is an explanatory diagram showing an example of a first exemplary embodiment of a synthetic aperture radar image analysis system according to the present invention.

The synthetic aperture radar image analysis system 10 shown in FIG. 1 aims to easily grasp information of reflected waves to electromagnetic waves measured by a SAR with respect to each object recorded in geospatial information by associating pixels of a SAR image with objects.

As shown in FIG. 1, the synthetic aperture radar image analysis system 10 of the present exemplary embodiment includes an image analysis device 100. The image analysis device 100 of the present exemplary embodiment can easily associate the pixels of the SAR image with the object.

As shown in FIG. 1, the synthetic aperture radar image analysis system 10 may also include a SAR image storage device 300. The dashed lines described in FIG. 1 indicate where data (Information) may flow.

A SAR image photographing apparatus 600 is, for example, a SAR satellite. The SAR image storage device 300 stores the SAR image photographed by the SAR image photographing apparatus 600. The SAR image storage device 300 is a server or a hard disk, for example.

As shown in FIG. 1, the synthetic aperture radar image analysis system 10 may also include an input interface 400 or may also include a geospatial information storage device 500. The user can input the scanned data of, for example, a handwritten map or a paper map to the image analysis device 100 through the input interface 400. The input interface 400 is, for example, a mouse, a touch panel, a keyboard, and a scanner.

Geospatial information is stored in the geospatial information storage device 500. Geospatial information is information in which geographical information and related information are associated with each other. Geospatial information is, for example, map data that is data in which information of objects such as buildings and roads are associated with geographical coordinates.

The geospatial information may be various aerial photographs or satellite photographs, which are data in which geographical coordinates are associated with light reflection characteristics. The SAR image storage device 300 is a server or a hard disk, for example.

The image analysis device 100 inputs a SAR image and geospatial information. For example, the image analysis device 100 may acquire the SAR image from the SAR image photographing apparatus 600 or from the SAR image storage device 300. The image analysis device 100 may also acquire the geospatial information from the input interface 400 or from the geospatial information storage device 500.

As shown in FIG. 1, the image analysis device 100 associates pixels (hereinafter referred to as a SAR pixel) of an inputted SAR image with each object recorded in the inputted geospatial information. After the association, the image analysis device 100 outputs the correspondence relation between the object and the SAR pixel.

Figure 2:
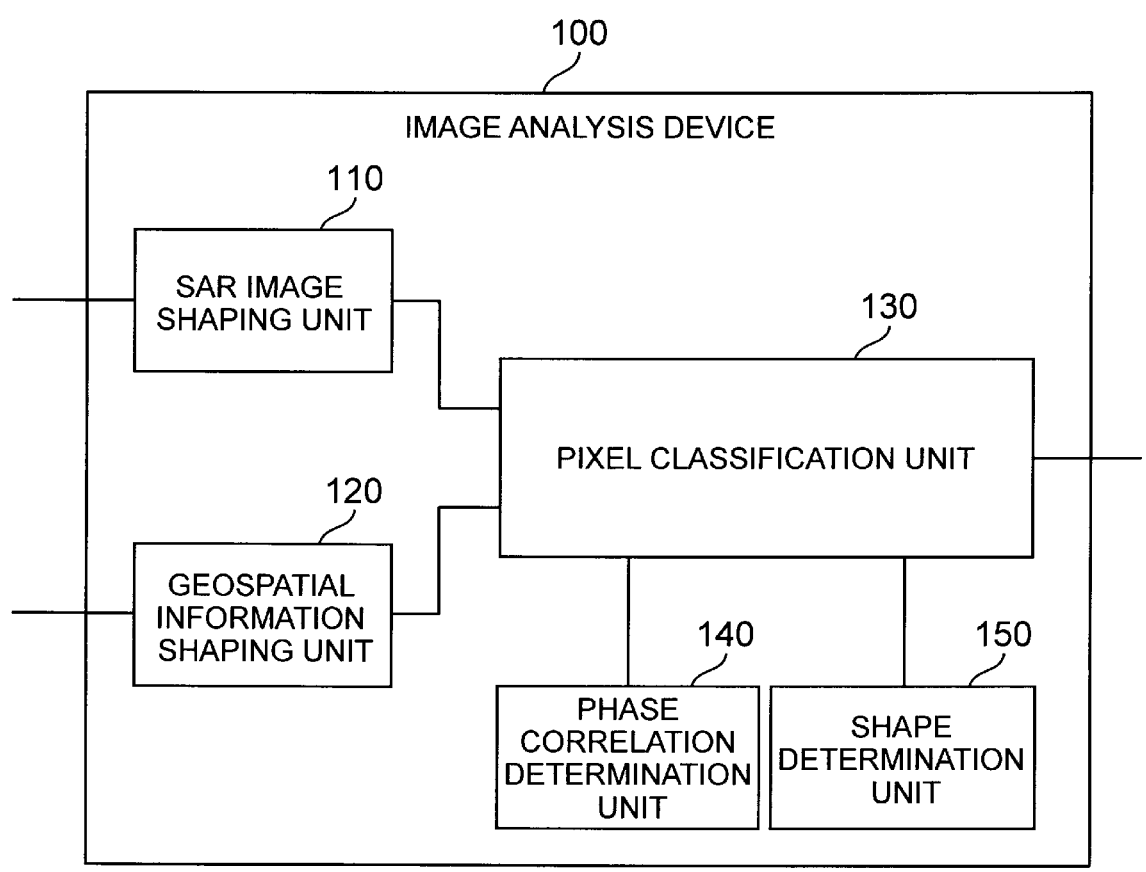
FIG. 2 is a block diagram showing a configuration example of an image analysis device 100 of the first exemplary embodiment.

FIG. 2 is a block diagram showing a configuration example of the image analysis device 100 of the first exemplary embodiment. As shown in FIG. 2, the image analysis device 100 includes a SAR image shaping unit 110, a geospatial information shaping unit 120, a pixel classification unit 130, a phase correlation determination unit 140, and a shape determination unit 150. As shown in FIG. 2, the SAR image shaping unit 110, the geospatial information shaping unit 120, the phase correlation determination unit 140, and the shape determination unit 150 are connected to the pixel classification unit 130, respectively.

The SAR image shaping unit 110 has a function of shaping the information of the SAR image into a predetermined format and outputting the information. The SAR image shaping unit 110 first receives the SAR image as an input.

The intensity and phase of the reflected wave to electromagnetic waves are recorded in the pixels of the inputted SAR image. The SAR image shaping unit 110 corrects, for example, positional deviation between images, with respect to a plurality of SAR images to be inputted.

When positioning between images, the SAR image shaping unit 110 selects one image (hereinafter referred to as a reference image) to be a reference from the inputted SAR images. The SAR image shaping unit 110 then searches for a pixel of another inputted SAR image in which the same point as the point recorded in the pixel of the selected reference image is recorded. The SAR image shaping unit 110 associates pixels of a reference image with searched pixels.

When searching for pixels recorded at the same point, the SAR image shaping unit 110 may use a method generally used for alignment between optical images. When using a method used for alignment between optical images, the SAR image shaping unit 110 searches for a characteristic pattern from the display content of the reference image, and searches for a pattern similar to the characteristic pattern searched for from the display content of other input images. The SAR image shaping unit 110 may perform an alignment on the assumption that the searched similar patterns represent patterns at the same point.

FIG. 3 is an explanatory diagram showing an example of SAR image information outputted by the SAR image shaping unit 110. As shown in FIG. 3, the SAR image information includes a SAR image ID (Identifier), a reference image flag, a SAR pixel ID, a position, a luminance, and a phase.

The SAR image ID is an identifier for identifying each SAR image. The reference image flag is information indicating whether the SAR image indicated by the SAR image ID is used as the reference image. The SAR image whose reference image flag is "TRUE" is used as the reference image. The SAR image whose reference image flag is "FALSE" is not used as the reference image.

The SAR pixel ID is also an identifier for identifying each pixel of the SAR image. The position, luminance, and phase are the position, luminance, and phase of the pixel indicated by the SAR pixel ID, respectively.

FIG. 4 is an explanatory diagram showing an example of SAR pixel information outputted by the SAR image shaping unit 110. As shown in FIG. 4, the SAR pixel information includes a SAR pixel ID, a position, and a phase sequence.

The SAR pixel ID is the SAR pixel ID shown in FIG. 3. Note that the SAR pixel information is generated for the SAR pixel ID indicating the SAR pixel of the reference image.

The alignment of each inputted SAR image is performed on the reference image. In other words, the SAR pixels of the other inputted SAR images corresponding to the SAR pixels of the reference image are uniquely determined. Therefore, in the present exemplary embodiment, the SAR pixel ID of the SAR pixel of the reference image is recorded in the SAR pixel ID of the SAR pixel information.

The position shown in FIG. 4 is the position of the SAR pixel of the inputted SAR image. For the above reason, only the position of the SAR pixel of the reference image among the plurality of inputted SAR images is stored in the SAR pixel information.

The phase sequence shown in FIG. 4 is a sequence of phases included in pixel values of pixels of a plurality of inputted SAR images. The phase is the information recorded in each SAR pixel, and is the information on the delay of the electromagnetic wave measured by the SAR. The phase sequence is recorded when the SAR pixel recording the same point as the point recorded in the SAR pixel of the reference image is acquired from another inputted SAR images.

For example, the SAR image shaping unit 110 may determine a SAR image to be a reference of a phase in an inputted SAR image, and determine a phase difference between the inputted SAR image and the reference SAR image as a phase.

The SAR image shaping unit 110 may also determine the phase from which the phase change depending on the elevation in the photographing area has been removed by using a DEM that is data in which the elevation of each point has been recorded. Further, the SAR image shaping unit 110 may determine the phase from which the phase change depending on the state of the atmosphere has been removed.

The phase may be recorded in the SAR pixel information in the form of an angle. In addition, a complex number whose phase angle is a polar angle and whose absolute value is 1 may be recorded in the SAR pixel information.

The geospatial information shaping unit 120 has a function of extracting the location and shape of each object, such as a road or a building, from the inputted geospatial information, shaping the information into a predetermined format, and outputting the information. The geospatial information shaping unit 120 first receives geospatial information as an input.

FIG. 5 is an explanatory diagram showing an example of geospatial information outputted by the geospatial information shaping unit 120. As shown in FIG. 5, the geospatial information outputted by the geospatial information shaping unit 120 includes an object ID, a position, and a shape.

The object ID is an identifier for identifying the object. The position and shape are those of the object indicated by the object ID.

The geospatial information shaping unit 120 performs a different shaping process according to the form of the inputted geospatial information. For example, when the inputted geospatial information is an electronic map, as shown in FIG. 6, an ID for identifying, for example, a building or a road may have already been assigned to the electronic map at the time of the input.

Figure 6:
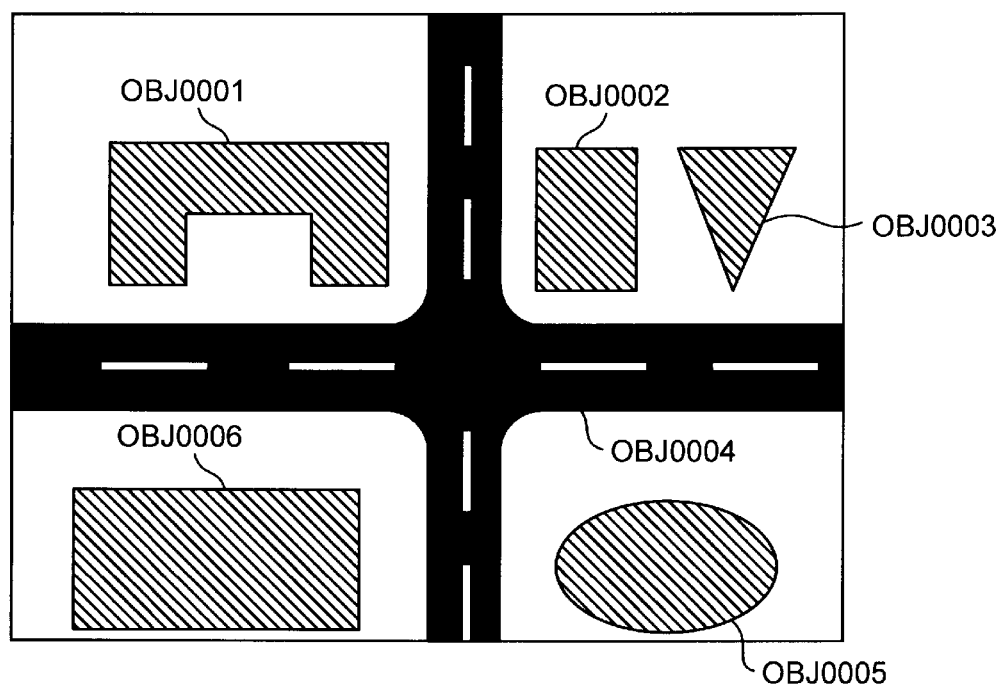
FIG. 6 is an explanatory diagram showing an example of an electronic map inputted to the geospatial information shaping unit 120.

FIG. 6 is an explanatory diagram showing an example of an electronic map inputted to the geospatial information shaping unit 120. Each of OBJ0001 to OBJ0003 and OBJ0005 to OBJ0006 shown in FIG. 6 is a building. In addition, OBJ0004 is a road.

When an electronic map as shown in FIG. 6 is inputted, the geospatial information shaping unit 120 simply extracts an object indicated by each ID from the electronic map, shapes the object, and outputs the object.

When the geospatial information to be inputted is an aerial photograph or a satellite photograph, the object in the photograph may be unclear at the time of input. When a photograph whose object in the photograph is unclear is inputted, the geospatial information shaping unit 120 specifies the object in the photograph by image recognition, for example.

After the specification, the geospatial information shaping unit 120 assigns an object ID to each object in the photograph. The geospatial information shaping unit 120 then outputs geospatial information in which the location and shape of each object are associated with the object ID.

Alternatively, instead of specifying an object in the photograph, the geospatial information shaping unit 120 may simply specify a pixel having a pixel value that is significantly different from the pixel values of adjacent pixels. The geospatial information shaping unit 120 may then divide the specified plurality of pixels into one or more pixel groups and assign an object ID to each of the divided pixel groups.

The pixels whose pixel values are significantly different from the pixel values of the adjacent pixels obtained by the above method often represent the contour of a building or the contour of a road, for example. Therefore, the geospatial information shaping unit 120 can easily generate geospatial information by assigning the object ID to each pixel group and recording the shape of the distribution of pixels of the pixel group.

Note that, for example, a method for including consecutive pixels in one pixel group may be used as a method for dividing pixels into pixel groups. Alternatively, a method of including pixels arranged in a specific pattern, such as a straight line, in one pixel group may be used.

The pixel classification unit 130 has a function of computing the set of the division result of pixels into pixel groups and the object corresponding to the pixel groups. The pixel classification unit 130 appropriately moves, rotates, enlarges, reduces, or deforms each object extracted from the geospatial information in parallel. The pixel classification unit 130 also divides a plurality of SAR pixels into pixel groups in several patterns.

The pixel classification unit 130 computes the set by using the phase correlation determination unit 140 and the shape determination unit 150. The phase correlation determination unit 140 has a function of determining the strength of phase correlation between pixels constituting each pixel group. The shape determination unit 150 has a function of determining the similarity or degree of similarity between the shape of the distribution of pixels constituting each pixel group and the object shape.

Finally, the pixel classification unit 130 includes, in a computation set, a pixel group in which the phase between the constituent pixels is most strongly correlated. The pixel classification unit 130 may include, in a computation set, a pixel group in which the strength of phase correlation between the constituent pixels is greater than or equal to a predetermined value.

Further, the pixel classification unit 130 includes, in the set, an object having a shape most similar to the shape of the distribution of the pixel groups included in the set. Note that the pixel classification unit 130 may include, in the set, an object whose degree of similarity between the shape of the distribution of the pixel group included in the set and the shape is greater than or equal to a predetermined value.

The phase correlation determination unit 140 has a function of receiving as an input, for example, a plurality of SAR images obtained by photographing an identical location, SAR pixel information relating to the plurality of SAR images, and geospatial information such as a map and determining whether phase changes are correlated between SAR pixels.

The phase correlation determination unit 140 selects a SAR image to be one reference image from a plurality of SAR images obtained by photographing an identical area to be inputted. The phase correlation determination unit 140 extracts pixels recorded at the same point as each of the SAR pixels of the reference image from a plurality of inputted SAR images, on the basis of the SAR pixel information. The phase correlation determination unit 140 then determines the strength of phase correlation between the SAR pixels of the reference image on the basis of the phase sequence of the extracted pixels.

The phase correlation determination unit 140 receives a phase sequence in the form of a complex number, for example. The phase correlation determination unit 140 computes the strength of phase correlation between the SAR pixels on the basis of the received phase sequence. The strength of phase correlation is computed as follows, for example.

The SAR pixels to be evaluated for the phase correlation are assumed to be $i_A$ and $i_B$. Also assumed is that N number of SAR images are inputted and one to n number of SAR image IDs are assigned to each SAR image.

If the value of the phase of the pixel whose SAR pixel ID is i in the SAR image whose SAR image ID is n is expressed as $s_i(n)$, the phase sequence is expressed by a row vector $\vec{s_i} = (s_i(1), s_i(2), \ldots, s_i(N))^T$. The symbol T represents an operation that transposes a matrix.

Note that the symbol such as "→" used in the text in the specification should be described directly above the preceding character, but described immediately after the character as described above due to the limitation of the text notation. In the expression, these symbols are described in their original positions.

If the phase sequence is inputted in the form of a complex number, the strength of phase correlation between $\vec{s_{iA}}$ and $\vec{s_{iB}}$ is computed by, for example, the following expression.

[Expression 1]

$$|\vec{s_{iA}} * W \vec{s_{iB}}| \quad \text{Expression (1)}$$

Where the symbol "*" in Expression (1) represents an operation that takes a complex conjugate transposition of a matrix. W is a semi-definite matrix used to weight each element of the phase sequence. For W, for example, a diagonal matrix in which the diagonal elements are all 0 or more is used. For W, a diagonal matrix in which the diagonal elements are all 1 may also be used.

The symbol "||" in Expression (1) represents an operation that takes the absolute value of the enclosed expression. Expression (1) has a property of taking a maximum value when the two vectors $\vec{s_{iA}}$ and $\vec{s_{iB}}$ completely coincide or the phase difference between $\vec{s_{iA}}$ and $\vec{s_{iB}}$ is always constant. Therefore, the phase correlation determination unit 140 can use the value of Expression (1) as the strength of phase correlation.

Note that the phase correlation determination unit 140 may determine the strength of phase correlation by applying a monotonically increasing function to Expression (1). For example, the phase correlation determination unit 140 may determine as the strength of phase correlation by applying a function such as $f(x)=x^2$ to Expression (1).

The shape determination unit 150 has a function of determining the similarity in shape. The shape determination unit 150 determines whether the shape of the distribution of the SAR pixel group composed of the plurality of SAR pixels is similar to the object shape indicated by the geospatial information.

When a plurality of SAR pixels of a reference image is grouped as a SAR pixel group, the shape determination unit 150 determines whether the shape of the distribution of the SAR pixel group is similar to the object shape indicated by the geospatial information. The shape determination unit 150 determines the similarity in shape between the SAR pixel group indicated by the SAR pixel information inputted from the pixel classification unit 130 and the object.

For example, the shape determination unit 150 determines the similarity in shape as follows. The shape determination unit 150 first computes the distance between each of the SAR pixels constituting the SAR pixel group and the object with respect to the SAR pixel group and the object.

When the SAR pixel exists outside the contour line of the object, the shape determination unit 150 may compute the distance between the SAR pixel and the point that exists on the contour line of the object and has the shortest distance from the SAR pixel as the distance between the object and the SAR pixel. When the SAR pixel exists inside the contour line of the object, the shape determination unit 150 may compute the distance between the object and the SAR pixel as 0.

The shape determination unit 150 applies a function having a larger output as the distance becomes shorter, to each distance between the object and each SAR pixel obtained by, for example, the above method. For example, the shape determination unit 150 may apply a Gaussian function to the computed distance. The shape determination unit 150 may also apply a function of outputting 1 only when the computed distance is 0, and outputting 0 when a distance other than 0 is computed.

The total value of the output values of the functions whose output is larger as the distance is shorter is a value which becomes larger as the shape of the distribution of the SAR pixel group and the object shape are similar. In other words, the shape determination unit 150 can use the total value of the output values as an evaluation value of the similarity in shape.

When the total value is determined, the shape determination unit 150 may appropriately perform weighting. The shape determination unit 150 may also use the normalized total value as an evaluation value. In the case of normalization, the shape determination unit 150 may normalize the total value by dividing the total value by the number of elements of the SAR pixel group. The shape determination unit 150 may also normalize the total value by dividing the total value by the area in which the object occupies the geographical space.

Further, the shape determination unit 150 may compute a harmonic average of a value obtained by multiplying the number of elements of the SAR pixel group by an arbitrary coefficient and a value obtained by multiplying the area of the object by an arbitrary coefficient in consideration of both of the above methods, and normalize the total value by dividing the total value by the computed harmonic average.

The shape determination unit 150 determines the similarity in shape by using the evaluation value obtained as described above. In addition to the above method, the shape determination unit 150 may determine the similarity in shape by, for example, the following method.

Figure 7:
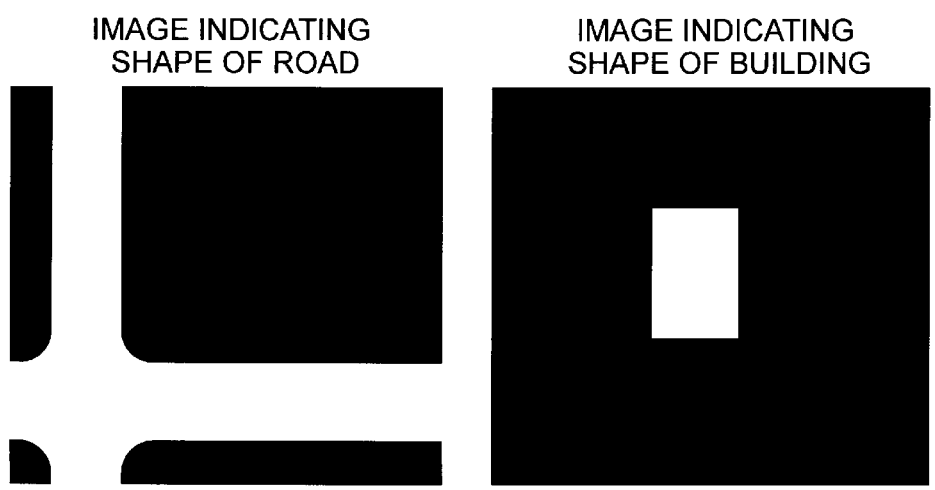
FIG. 7 is an explanatory diagram showing an example of an image indicating the object shape generated by a shape determination unit 150.

The shape determination unit 150 first generates an image indicating the object shape to be determined for similarity in shape. FIG. 7 is an explanatory diagram showing an example of an image indicating the object shape generated by the shape determination unit 150. FIG. 7 shows an image indicating the shape of a road and an image indicating the shape of a building.

The image shown in FIG. 7 is an image in which the inside of the contour of the object is all white and the outside of the contour of the object is all black. In the image shown in FIG. 7, white represents "1" and black represents "0".

For example, in the image indicating the shape of the road shown in FIG. 7, the part of the road is white and the other part is black. In the image indicating the shape of the building shown in FIG. 7, the part of the building is white and the other part is black.

The shape determination unit 150 may also generate an image in which the inside of the contour of the object is a color representing a positive real number and the outside of the contour of the object is all black. In addition, the shape determination unit 150 may perform a blurring process on the image indicating the object shape according to the difference between the object shape recorded in the geospatial information and the actual object shape.

The shape determination unit 150 then generates an image indicating the shape of the distribution of the SAR pixel group. FIG. 8 is an explanatory diagram showing an example of an image indicating the shape of the distribution of the SAR pixel group generated by the shape determination unit 150. FIG. 8 shows an image indicating the SAR pixel group A and an image indicating the SAR pixel group B.

The image shown in FIG. 8 is an image in which the pixel at the position of the SAR pixel constituting the SAR pixel group is white and the other pixels are black. In the image shown in FIG. 8, white represents "1" and black represents "0".

The shape determination unit 150 may also generate an image in which the pixel at the position of the SAR pixel is a color representing a positive real number and the other pixels are black. In addition, the shape determination unit 150 may perform a blurring process on an image indicating the shape of the distribution of the SAR pixel group according to the distortion of the shape of the distribution, for example.

The shape determination unit 150 then computes a multiplication image by multiplying the image indicating the object shape by the image indicating the shape of the distribution of the SAR pixel group. The shape determination unit 150 can use the computed sum of the pixel values over the entire multiplication image as an evaluation value of the similarity in shape.

The shape determination unit 150 may also use the normalized total value as an evaluation value. In the case of normalization, the shape determination unit 150 may normalize the total value by dividing the total value of the pixel values over the entire multiplication image by the total value of the pixel values over the entire image indicating the object shape or the total value of the pixel values over the entire image indicating the shape of the distribution of the pixel group.

Alternatively, the shape determination unit 150 may compute the harmonic average after appropriately weighting the sum of the pixel values over the entire image indicating the object shape and the sum of the pixel values over the entire image indicating the shape of the distribution of the pixel group.

The shape determination unit 150 normalizes the total value by dividing the total value of pixel values over the entire multiplication image by the computed harmonic average. The shape determination unit 150 determines the similarity in shape by using the evaluation value obtained as described above.

The pixel classification unit 130 outputs, as object-SAR pixel correspondence information, information indicating the set of the pixel group and the corresponding object obtained in the above process. FIG. 9 is an explanatory diagram showing an example of the object-SAR pixel correspondence information outputted by the pixel classification unit 130.

As shown in FIG. 9, the object-SAR pixel correspondence information includes an object ID and a SAR pixel ID. As shown in FIG. 9, the object-SAR pixel correspondence information may also include a SAR pixel group ID. The SAR pixel group ID is an identifier for identifying the pixel group. The pixel classification unit 130 uses the SAR pixel group ID when comparing the shape of the distribution of the SAR pixel group with the object shape.

Referring to the object-SAR pixel correspondence information outputted by the pixel classification unit 130 enables the user to grasp the SAR pixel corresponding to each object. As described above, the pixel classification unit 130 associates the SAR pixel group having strong phase correlation between the constituent SAR pixels with an object whose shape indicated by the geospatial information is similar to the shape of the distribution on the basis of the determination result by the phase correlation determination unit 140 and the determination result by the shape determination unit 150.

The image analysis device 100 of the present exemplary embodiment can easily associate the pixels of the SAR image with the object. The likelihood of association between the SAR pixel group indicated by the object-SAR pixel correspondence information outputted by the pixel classification unit 130 and the object is guaranteed for the following reasons.

The phase in the SAR image represents a subtle delay in the irradiated electromagnetic wave. The phase also changes sensitively to the height and displacement of the object. Therefore, grouping the pixels whose phases are strongly correlated enables the pixel classification unit 130 to extract a pixel group in which an identical object which is considered to be similar in height and displacement is likely to be displayed.

Although the shape of the distribution of the SAR pixel group of the SAR image is affected by a phenomenon called layover or foreshortening and is accompanied by distortion peculiar to the SAR image, the shape of the distribution has a property of maintaining the shape in the geographical space at a predetermined level. Therefore, the pixel classification unit 130 can extract, from the SAR image, a SAR pixel group whose shape of the distribution is similar to the object shape for each object indicated by the geospatial information and associate the SAR pixel group and the object with each other.

As described above, the pixel classification unit 130 of the present exemplary embodiment associates the SAR pixel group in which the phases of the constituent SAR pixels are strongly correlated with objects whose shapes are similar to shapes of the distributions among the objects indicated by the geospatial information. Therefore, the image analysis device 100 of the present exemplary embodiment can reasonably associate each object indicated by the geospatial information with the SAR pixel group of the SAR image.

[Description of Operation]

Figure 10:
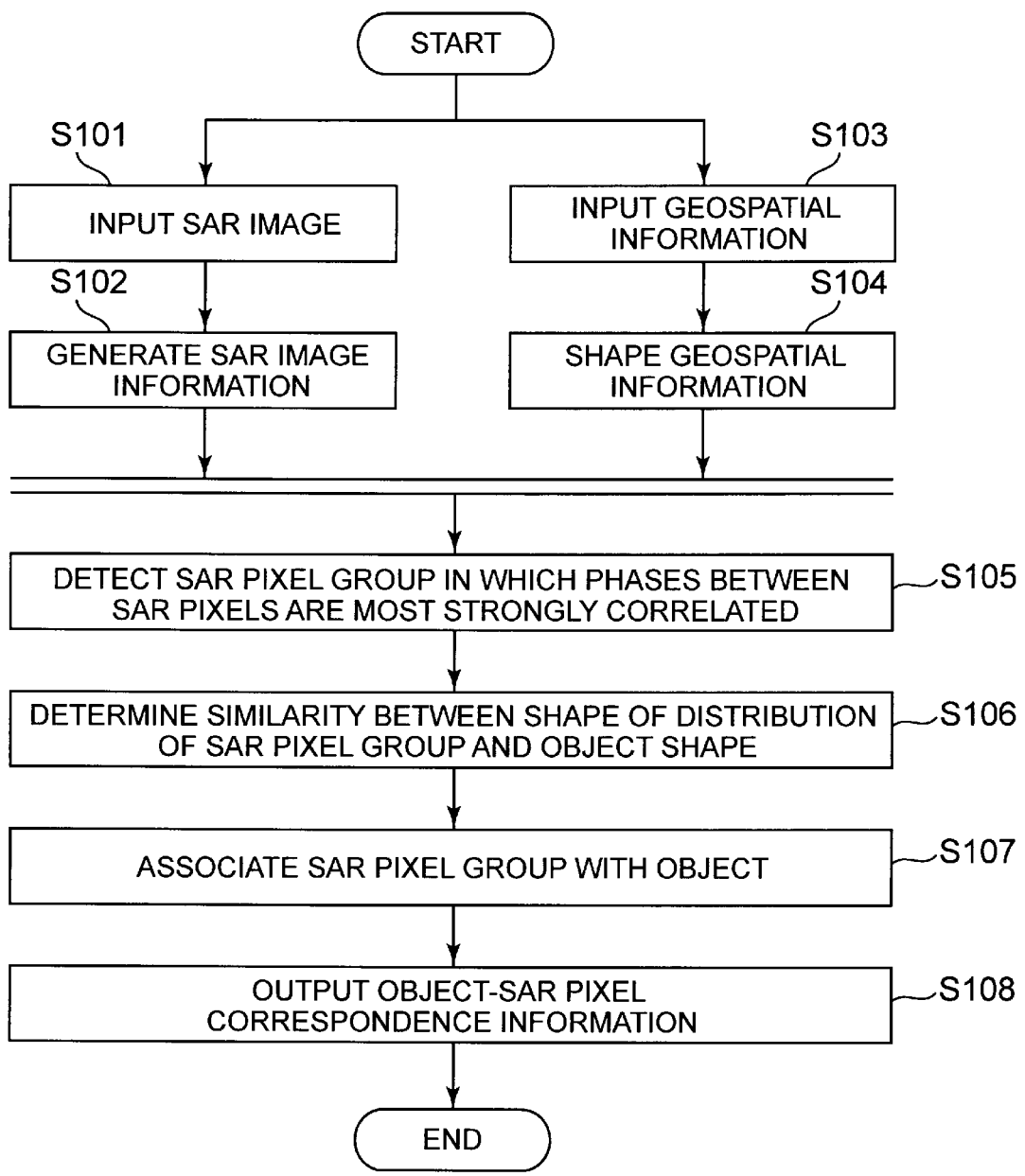
FIG. 10 is a flowchart showing the operation of the SAR pixel association process by the image analysis device 100 of the first exemplary embodiment.

The operation of associating the SAR pixels with an object of the image analysis device 100 of the present exemplary embodiment will be described below with reference to FIG. 10. FIG. 10 is a flowchart showing the operation of the SAR pixel association process by the image analysis device 100 of the first exemplary embodiment.

The image analysis device 100 first receives as inputs a plurality of SAR images stored in the SAR image storage device 300 such as a server or a plurality of SAR images photographed by the SAR image photographing apparatus 600 (step S101).

The SAR image shaping unit 110 then generates SAR image information and SAR pixel information on the basis of the plurality of inputted SAR images. The SAR image shaping unit 110 inputs the generated SAR image information and SAR pixel information to the pixel classification unit 130 (step S102).

Also, independently of the processes in steps S101 to S102, the image analysis device 100 receives, as an input, the geospatial information in which the object shape is recorded from the geospatial information storage device 500 such as a server or the input interface 400 (step S103).

The geospatial information shaping unit 120 then shapes the inputted geospatial information into a predetermined format (step S104). The geospatial information shaping unit 120 shapes the geospatial information into the format shown in FIG. 5, for example. The geospatial information shaping unit 120 inputs the shaped geospatial information to the pixel classification unit 130.

After the input of the SAR image information and the SAR pixel information and the input of the geospatial information are completed, the pixel classification unit 130 causes the phase correlation determination unit 140 and the shape determination unit 150 to determine the strength of phase correlation between the SAR pixels and the similarity in shape, respectively.

The phase correlation determination unit 140 first detects a SAR pixel group in which the phases between the constituent SAR pixels are most strongly correlated among the SAR pixel groups indicated by the SAR pixel information (step S105).

The shape determination unit 150 then determines the similarity between the shape of each object indicated by the geospatial information and the shape of the distribution of the SAR pixel group detected in the step S105 (step S106).

The pixel classification unit 130 associates the object indicating the shape determined to have the highest similarity with the shape of the distribution with the SAR pixel group of the inputted SAR image (step S107). The pixel classification unit 130 then generates object-SAR pixel correspondence information indicating the associated SAR pixel group and the object.

The pixel classification unit 130 then outputs the generated object-SAR pixel correspondence information (step S108). After the output, the image analysis device 100 ends the SAR pixel association process.

[Description of Effects]

The image analysis device 100 of the present exemplary embodiment can associate a SAR pixel of a SAR image with an object indicated by geospatial information such as a map.

The image analysis device 100 includes a phase correlation determination unit 140 for determining the strength of correlation between SAR pixels of phases observed over a plurality of SAR images, and a shape determination unit 150 for determining the similarity between the object shape indicated by geospatial information and the shape of the distribution of a SAR pixel group.

The image analysis device 100 includes a pixel classification unit 130 for associating the SAR pixel group having the strongest phase correlation between the SAR pixels with an object having the highest similarity in the shape indicated by the geospatial information. In other words, the pixel classification unit 130 classifies the SAR pixels on the basis of the result of the determination by the phase correlation determination unit 140 and the result of the determination by the shape determination unit 150.

The pixel classification unit 130 associates a SAR pixel group in which phases are strongly correlated between constituent SAR pixels with objects whose shapes are similar to shapes of the distributions among the objects indicated by the geospatial information. Therefore, the image analysis device 100 of the present exemplary embodiment can associate the SAR pixel group or the SAR pixel with each object indicated by the geospatial information.

Second Exemplary Embodiment

[Description of Configuration]

Figure 11:
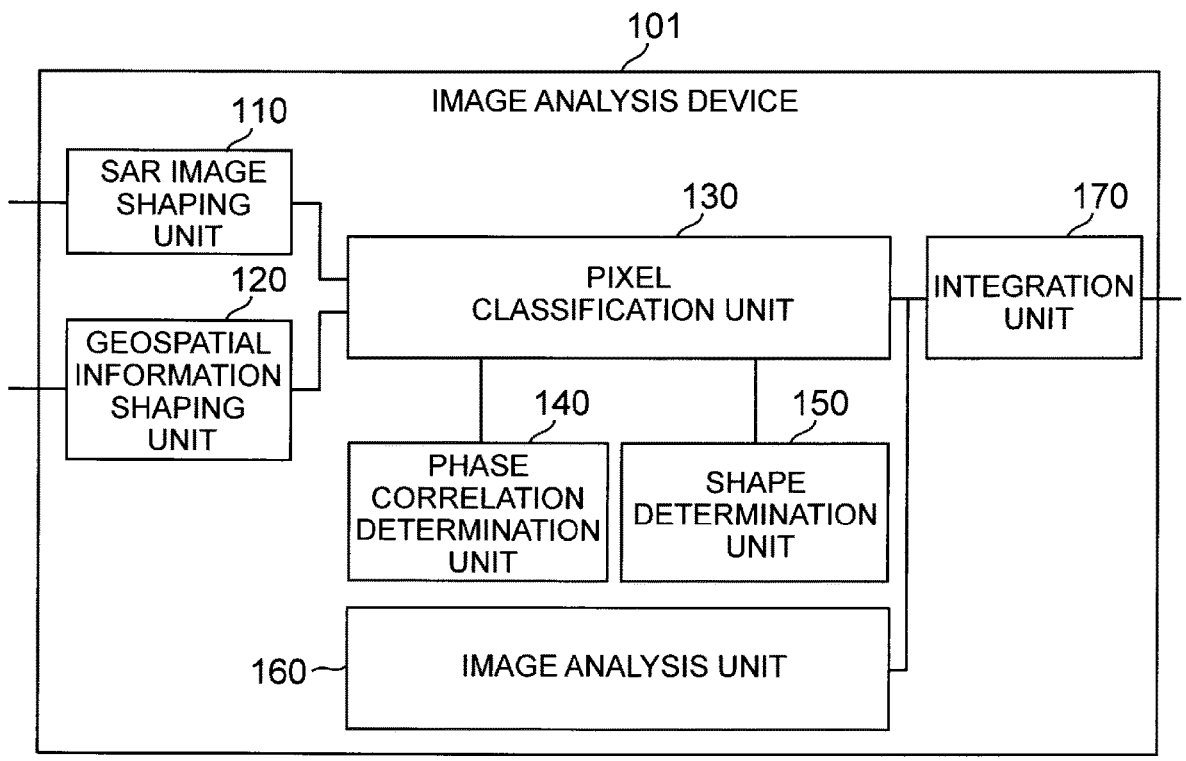
FIG. 11 is a block diagram showing a configuration example of an image analysis device 101 of a second exemplary embodiment.

A second exemplary embodiment of the present invention will now be described with reference to the drawings. FIG. 11 is a block diagram showing a configuration example of an image analysis device 101 of the second exemplary embodiment.

The image analysis device 101 shown in FIG. 11 differs from the image analysis device 100 shown in FIG. 2 in that the image analysis device 101 includes an image analysis unit 160 and an integration unit 170. The integration unit 170 is connected to the pixel classification unit 130 and the image analysis unit 160. The configuration of the image analysis device 101 other than the image analysis unit 160 and the integration unit 170 is the same as that of the image analysis device 100.

In the present exemplary embodiment, the image analysis device 101 is included in the synthetic aperture radar image analysis system 10 in place of the image analysis device 100. The image analysis device of the other exemplary embodiment is also included in the synthetic aperture radar image analysis system 10 in place of the image analysis device 100.

The image analysis unit 160 has a function of receiving the SAR image as an input and analyzing the SAR image. The image analysis unit 160 inputs the analysis result of the SAR image to the integration unit 170.

The image analysis unit 160 receives the SAR image as an input and computes information of each pixel of the SAR image. For example, using the method described in PTL 2 allows the image analysis unit 160 to analyze a plurality of SAR images to obtain displacement and elevation information of each pixel of the SAR image as information of each SAR pixel. In particular, the image analysis unit 160 can obtain information on the displacement and the elevation of a pixel (hereinafter referred to as a stable reflection point) in which a stable reflected wave is photographed.

Figure 12:
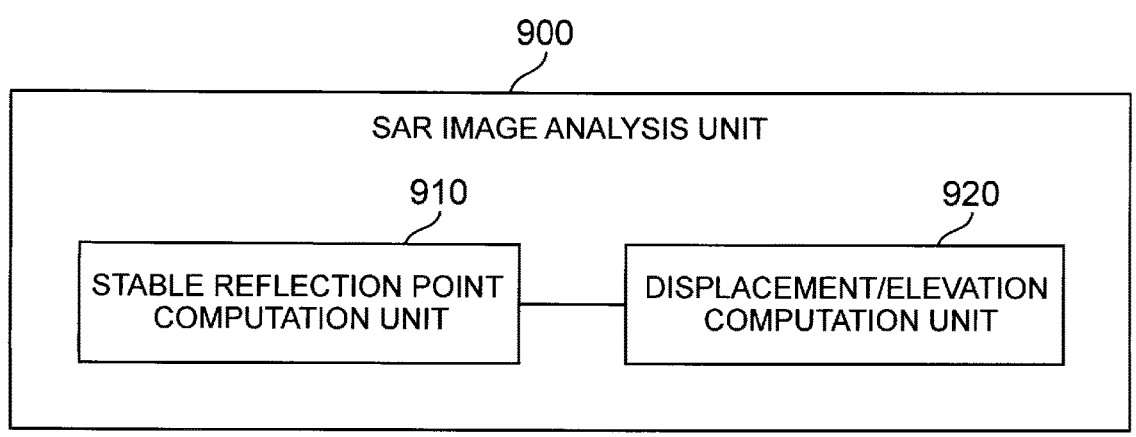
FIG. 12 is a block diagram showing the configuration of a SAR image analysis unit 900 included in a SAR image analysis system described in PTL 2.

FIG. 12 is a block diagram showing the configuration of a SAR image analysis unit 900 included in a SAR image analysis system described in PTL 2. The SAR image analysis unit 900 includes a stable reflection point computation unit 910 and a displacement/elevation computation unit 920.

The SAR image analysis unit 900 operates as follows. The stable reflection point computation unit 910 acquires a plurality of SAR images obtained by photographing over an identical area from a device storing the SAR images in order to analyze the phase difference at an identical point photographed over the plurality of SAR images.

The stable reflection point computation unit 910 computes a stable reflection point from the acquired plurality of SAR images. The stable reflection point is a pixel at a point where a stable reflected wave is photographed over the plurality of SAR images as described above. For example, in the SAR image analysis system described in PTL 2, pixels having stable luminance and pixels having stable phase are used as stable reflection points.

The displacement/elevation computation unit 920 then receives the stable reflection point computed by the stable reflection point computation unit 910 as an input, and computes the displacement and elevation of each SAR pixel. In particular, the displacement/elevation computation unit 920 computes the displacement and elevation at each stable reflection point. As described above, the image analysis unit 160 can obtain information on the displacement and the elevation of the pixel.

The integration unit 170 has a function of receiving the displacement and elevation information computed by the image analysis unit 160 and the object-SAR pixel correspondence information obtained by the pixel classification unit 130 as an input and integrating the displacement and elevation information of the SAR pixels with the object-SAR pixel correspondence information. The integration allows the integration unit 170 to generate integrated geospatial information.

The integrated geospatial information is information in which information obtained by analyzing SAR images is assigned to each object indicated by geospatial information. The integrated geospatial information is, for example, a map in which displacement information is attached to each object.

Figures 13, 14:
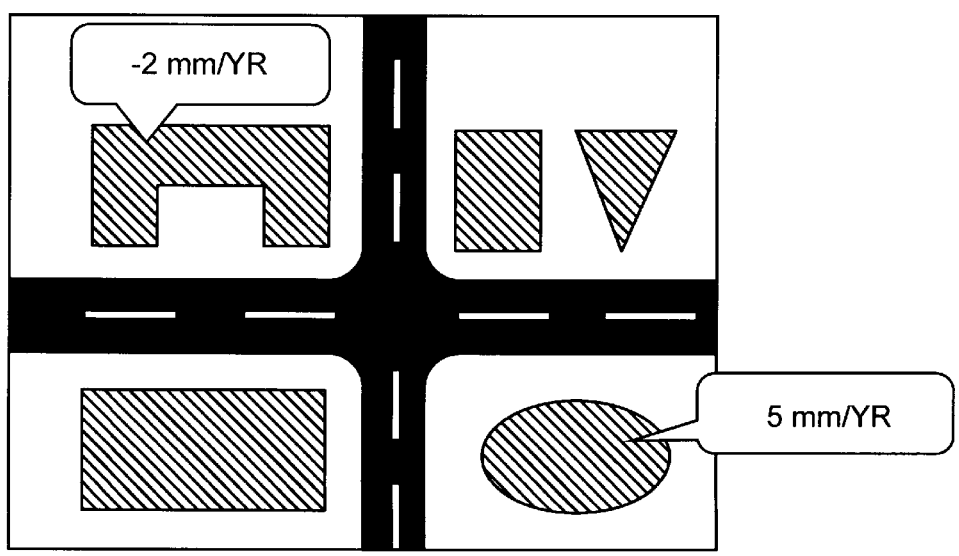
FIG. 13 is an explanatory diagram showing an example of integrated geospatial information generated by an integration unit 170.
FIG. 14 is an explanatory diagram showing another example of the integrated geospatial information generated by the integration unit 170.

FIG. 13 is an explanatory diagram showing an example of integrated geospatial information generated by the integration unit 170. As shown in FIG. 13, the object ID and the information obtained by the image analysis unit 160 are recorded in association with each other in the integrated geospatial information. The information obtained by the image analysis unit 160 is, for example, displacement and elevation.

When a plurality of SAR pixel groups is associated with one object, a plurality of pieces of information obtained from SAR images also exists for one object. When a plurality of pieces of information obtained from the SAR image exists, the integration unit 170 may record a representative value obtained by a statistical process such as averaging into the integrated geospatial information. The integration unit 170 may also record all the information in the integrated geospatial information.

When a representative value is obtained by a statistical process such as averaging, the integration unit 170 may weight a highly reliable extraction result by using an S/N ratio (Signal to Noise Ratio), stability of luminance, stability of phase, and coherence as an index representing temporal correlation or spatial correlation of phase in the SAR image, for example.

The integration unit 170 may compute a representative value by averaging the weighted extraction results. In addition, the integration unit 170 may digitize movement such as deflection and rotation obtained by integrating displacement in a plurality of locations, and record the digitized movement in integrated geospatial information.

FIG. 14 is an explanatory diagram showing another example of the integrated geospatial information generated by the integration unit 170. The integrated geospatial information shown in FIG. 14 is an integrated map. As shown in FIG. 14, the information obtained by the image analysis unit 160 is assigned to the area occupied by each object indicated by the integrated map. For example, in the integrated map shown in FIG. 14, information indicating the displacements of "−2 mm/yr" and "5 mm/yr" is assigned.

When a plurality of SAR pixel groups is associated with one object, a plurality of pieces of information obtained from SAR images also exists for one object. When a plurality of pieces of information obtained from the SAR images exists, the integration unit 170 may assign the SAR pixel group associated with the corresponding object as a point to the area occupied by the corresponding object indicated by the map.

The integration unit 170 may also assign information to a map after performing an interpolation process on a plurality of pieces of information obtained from the SAR images. In addition, the integration unit 170 may acquire one representative value by performing a statistical process such as averaging, and assign the representative value to all the areas occupied by the corresponding object on the map.

[Description of Operation]

Figure 15:
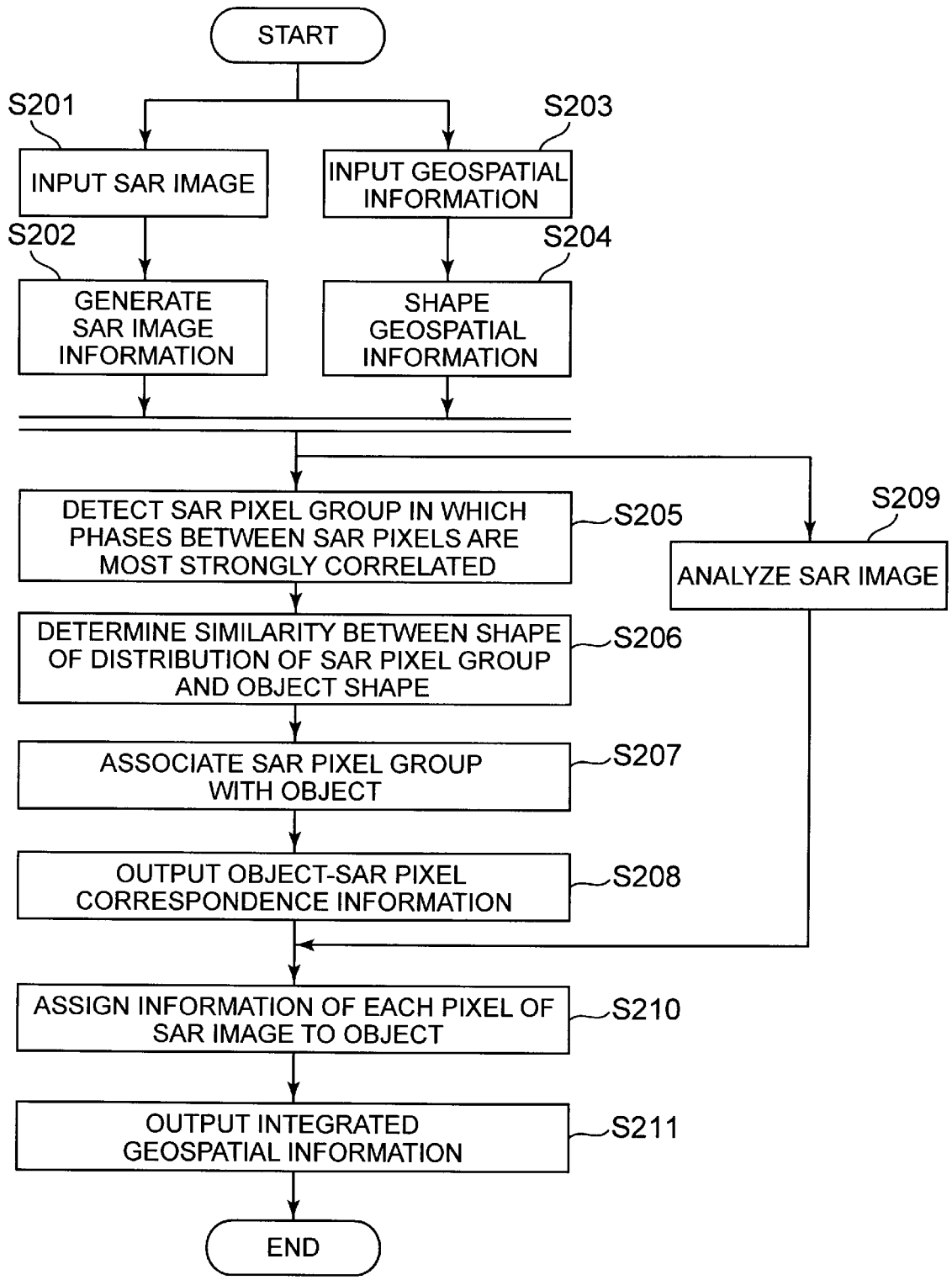
FIG. 15 is a flowchart showing the operation of the SAR pixel association process by the image analysis device 101 of the second exemplary embodiment.

The operation of associating the SAR pixels with an object of the image analysis device 101 of the present exemplary embodiment will be described below with reference to FIG. 15. FIG. 15 is a flowchart showing the operation of the SAR pixel association process by the image analysis device 101 of the second exemplary embodiment.

The processes in steps S201 to S208 are the same as those in steps S101 to S108 shown in FIG. 10.

The image analysis unit 160 analyzes the inputted SAR image independently of the processes in steps S205 to S208 (step S209). The analysis allows the image analysis unit 160 to compute information of each pixel of the SAR image. For example, the image analysis unit 160 computes information indicating the displacement and the elevation by using the method described in PTL 2.

The integration unit 170 then refers to the information of each pixel of the SAR image obtained by the image analysis unit 160, and assigns the information of the pixel associated with the object to the object-SAR pixel correspondence information outputted by the pixel classification unit 130 (step S210). Assigning information of pixels allows the integration unit 170 to generate integrated geospatial information.

The integration unit 170 outputs the generated integrated geospatial information (step S211). After the output, the image analysis device 101 ends the SAR pixel association process.

[Description of Effects]

The integration unit 170 of the image analysis device 101 of the present exemplary embodiment assigns information obtained from the SAR image to geospatial information. For example, since the information acquired from the SAR image is assigned to a map, the user can easily grasp the information obtained by the SAR image analysis.

For example, when the image analysis unit 160 analyzes the displacement on the basis of the SAR image, the integration unit 170 can generate a map in which the degree of rise or subsidence of each building is recorded. Referring to the generated map enables the user to easily determine, for example, the degree of risk of collapse of each building.

Third Exemplary Embodiment

[Description of Configuration]

Figure 16:
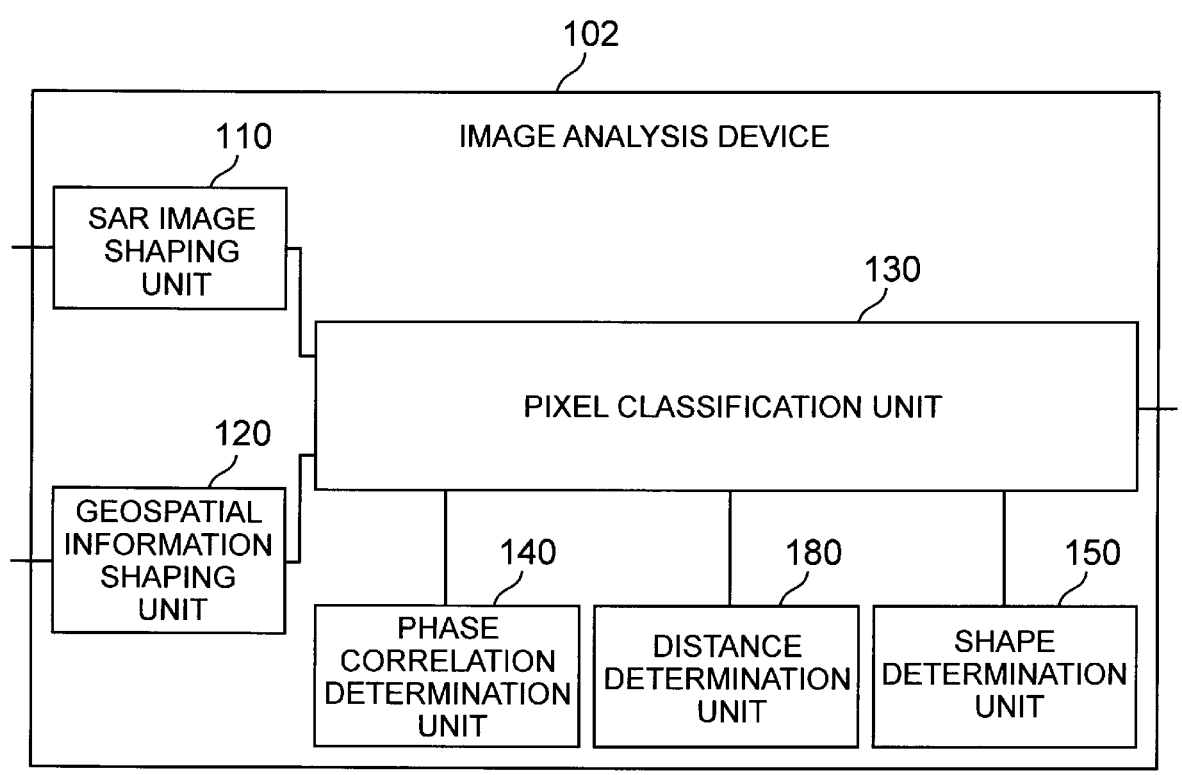
FIG. 16 is a block diagram showing a configuration example of an image analysis device 102 of a third exemplary embodiment.

A third exemplary embodiment of the present invention will now be described with reference to the drawings. FIG. 16 is a block diagram showing a configuration example of an image analysis device 102 of the third exemplary embodiment.

The image analysis device 102 shown in FIG. 16 differs from the image analysis device 100 shown in FIG. 2 in that the image analysis device 102 includes a distance determination unit 180. In addition to the phase correlation determination unit 140 and the shape determination unit 150, the distance determination unit 180 is newly connected to the pixel classification unit 130 of the present exemplary embodiment. The configuration of the image analysis device 102 other than the distance determination unit 180 is the same as that of the image analysis device 100.

The distance determination unit 180 has a function of determining whether the pixels of the reference image are close to each other. The distance determination unit 180 can use the result of applying a function that monotonically decreases with respect to the distance between pixels as an index indicating the degree of proximity.

For example, the SAR pixel IDs of the SAR pixels to be evaluated are assumed to be $i_A$ and $i_B$. The position of a pixel whose SAR pixel ID is i is expressed by a two-dimensional real vector $\vec{r_i}$. The distance between the pixel $i_A$ and the pixel $i_B$ is computed by, for example, the following expression.

[Expression 2]

$$\|\vec{r_{i_A}} - \vec{r_{i_B}}\|$$ 
Expression (2)

Where the symbol "$\| \|$" in Expression (2) represents an operation that computes the norm of the enclosed vector. The following function, for example, is applied to the distance computed by Expression (2).

[Expression 3]

$$f(x) = \exp(-\beta x^2)$$
Expression (3)

Where $\beta$ in Expression (3) is an appropriate positive real number. When the function of Expression (3) is applied to the distance between pixels, an index that approaches 1 as the pixels are closer together and approaches 0 as the pixels are farther apart is obtained. In other words, the distance determination unit 180 can obtain an index indicating the degree of proximity. Further, the distance determination unit 180 may simply use $f(x) = -x$ as the function to be applied.

The pixel classification unit 130 of the present exemplary embodiment refers to the result of the determination by the phase correlation determination unit 140, the result of the determination by the distance determination unit 180, and the result of the determination by the shape determination unit 150, and computes the set of the pixel group and the corresponding object.

In other words, the pixel classification unit 130 includes, in a computation set, SAR pixel groups in which the phases of the constituent SAR pixels are strongly correlated and the distance between the constituent SAR pixels is short (close in position). Further, the pixel classification unit 130 associates, with the SAR pixel group, an object having a shape similar to the shape of the distribution of the SAR pixel group included in the set, among the respective objects indicated by the geospatial information.

[Description of Operation]

Figure 17:
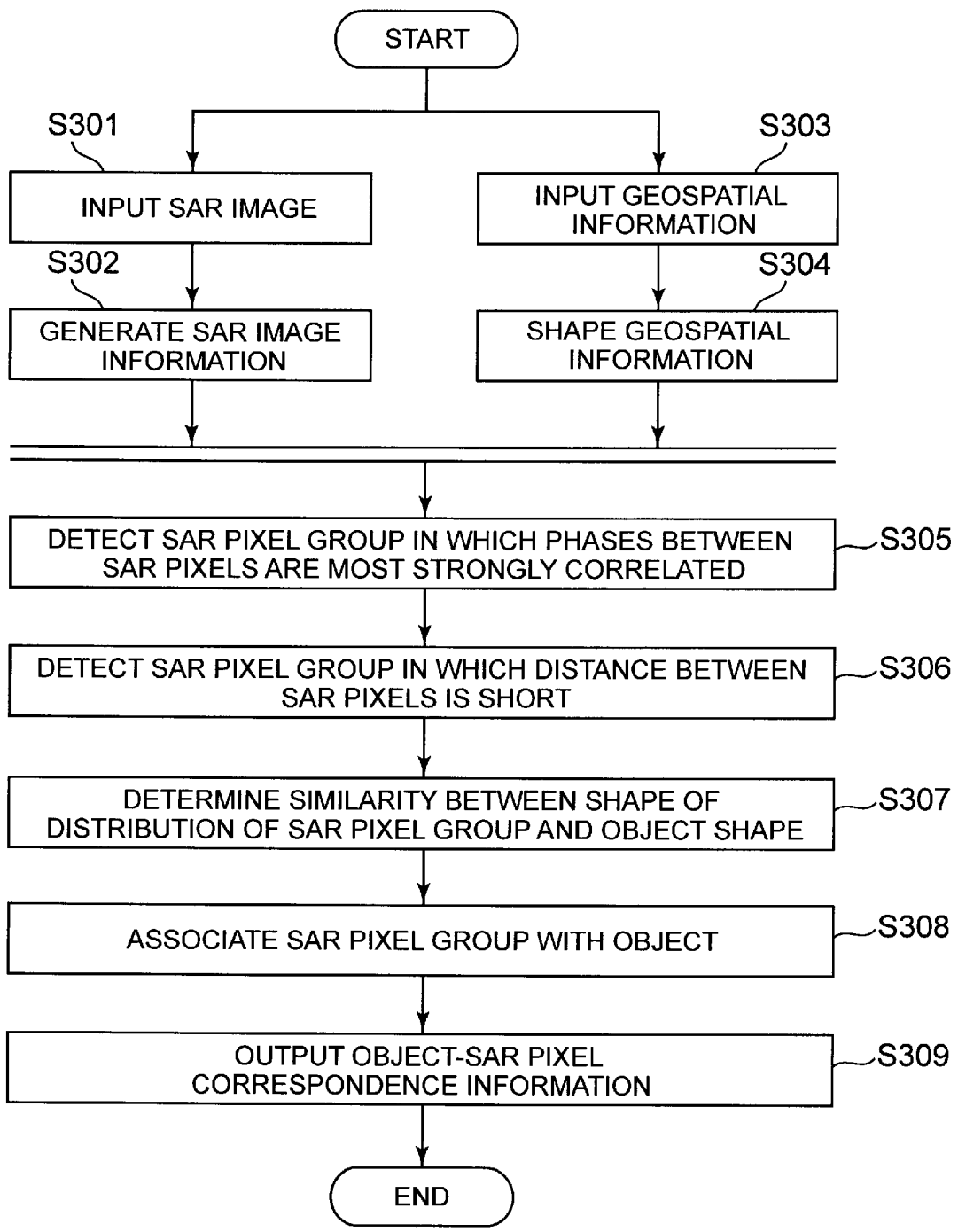
FIG. 17 is a flowchart showing the operation of the SAR pixel association process by the image analysis device 102 of the third exemplary embodiment.

The operation of associating the SAR pixels with an object of the image analysis device 102 of the present exemplary embodiment will be described below with reference to FIG. 17. FIG. 17 is a flowchart showing the operation of the SAR pixel association process by the image analysis device 102 of the third exemplary embodiment.

The processes in steps S301 to S304 are the same as those in steps S101 to S104 shown in FIG. 10.

After the input of the SAR image information and the SAR pixel information and the input of the geospatial information are completed, the pixel classification unit 130 causes the phase correlation determination unit 140, the distance determination unit 180, and the shape determination unit 150 to determine the strength of phase correlation between the SAR pixels, the degree of proximity between the pixels, and the similarity in shape, respectively.

The phase correlation determination unit 140 first detects a SAR pixel group in which the phases between the constituent SAR pixels are strongly correlated among the SAR pixel groups indicated by the SAR pixel information (step S305).

The distance determination unit 180 then detects a SAR pixel group in which the distance between the SAR pixels is shorter than a predetermined distance among the SAR pixel group detected in step S305 (step S306).

The shape determination unit 150 then determines the similarity between the shape of each object indicated by the geospatial information and the shape of the distribution of the SAR pixel group detected in the step S306 (step S307).

The processes in steps S308 to S309 are the same as those in steps S107 to S108 shown in FIG. 10.

[Description of Effects]

Since the image analysis device 102 of the present exemplary embodiment can associate the pixel group with the object in consideration of the distance between the SAR pixels, the association can be performed with higher accuracy. The reason for the association is that the pixel classification unit 130 refers to the result of the determination by the distance determination unit 180, so that each pixel having a strong correlation by chance despite being geographically distant can be classified into different clusters.

Fourth Exemplary Embodiment

[Description of Configuration]

Figures 18, 19:
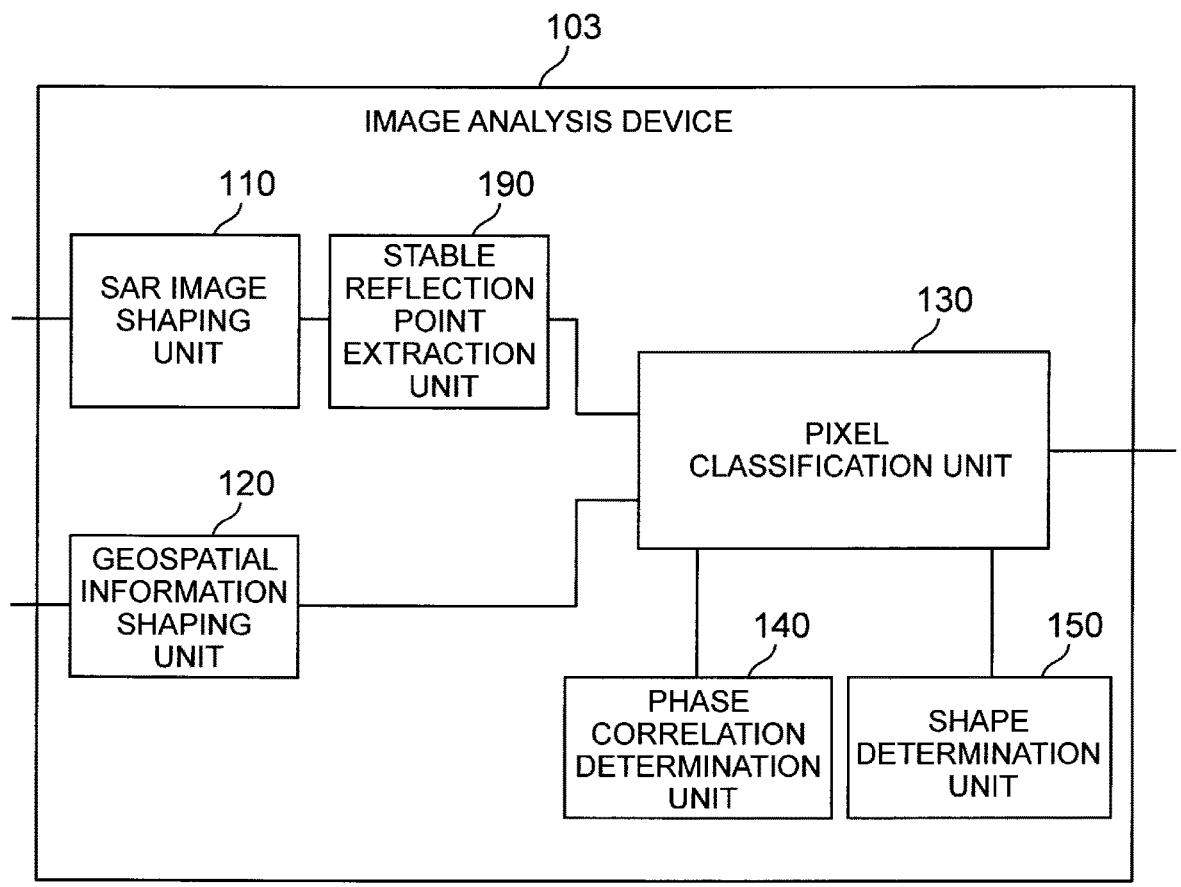
FIG. 18 is a block diagram showing a configuration example of an image analysis device 103 of a fourth exemplary embodiment.
FIG. 19 is an explanatory diagram showing an example of SAR pixel information outputted by a stable reflection point extraction unit 190.

A fourth exemplary embodiment of the present invention will now be described with reference to the drawings. FIG. 18 is a block diagram showing a configuration example of an image analysis device 103 of the fourth exemplary embodiment.

The image analysis device 103 shown in FIG. 18 differs from the image analysis device 100 shown in FIG. 2 in that the image analysis device 103 includes a stable reflection point extraction unit 190 between the SAR image shaping unit 110 and the pixel classification unit 130. The configuration of the image analysis device 103 other than the stable reflection point extraction unit 190 is the same as that of the image analysis device 100.

The stable reflection point extraction unit 190 has a function of receiving the SAR image as an input and extracting a stable reflection point which is a SAR pixel having stable luminance and phase of the SAR image. The stable reflection point extraction unit 190 inputs information indicating the extracted stable reflection point to the pixel classification unit 130.

The stable reflection point extraction unit 190 extracts a stable reflection point from the SAR image after the SAR image shaping unit 110 performs an alignment of the SAR images, for example. The stable reflection point extraction unit 190 extracts, as stable reflection points, SAR pixels whose luminance hardly changes over a plurality of SAR images from, for example, an inputted SAR image.

The stable reflection point extraction unit 190 also may extract, as stable reflection points, SAR pixels whose phases are stable except for phase changes due to, for example, displacement and elevation over a plurality of SAR images. The stable reflection point extraction unit 190 also may extract, as stable reflection points, SAR pixels having a small amount of noise included in the phase over a plurality of SAR images. The stable reflection point extraction unit 190 also may extract a PS (Permanent Scatterer), which is a stable reflection point, using the method described in PTL 2.

The pixel classification unit 130 of the present exemplary embodiment classifies only the stable reflection points extracted by the stable reflection point extraction unit 190.

FIG. 19 is an explanatory diagram showing an example of SAR pixel information outputted by the stable reflection point extraction unit 190. As shown in FIG. 19, the SAR pixel information includes a SAR pixel ID, a stable reflection point flag, a position, a phase sequence, and a luminance sequence.

The SAR pixel ID, position, and phase sequence shown in FIG. 19 are respectively similar to the SAR pixel ID, position, and phase sequence shown in FIG. 4. The luminance sequence shown in FIG. 19 is a sequence of luminance values included in pixel values of a plurality of inputted SAR images.

The luminance sequence is recorded when the pixel taking the same point as the SAR pixel of the reference image is acquired from another inputted SAR images. In other words, a sequence of phases included in the pixel values of each SAR image is recorded in the phase sequence. Further, a sequence of luminance included in the pixel value of each SAR image is recorded in the luminance sequence.

The stable reflection point flag is information indicating whether each of the SAR pixels is a stable reflection point. For example, if the SAR pixel indicated by the SAR pixel ID is a stable reflection point, the stable reflection point extraction unit 190 records "TRUE" in the stable reflection point flag. If the SAR pixel indicated by the SAR pixel ID is not a stable reflection point, the stable reflection point extraction unit 190 records "FALSE" in the stable reflection point flag.

The pixel classification unit 130 of the present exemplary embodiment associates the object only with the SAR pixel indicated by the SAR pixel ID recorded as "TRUE" in the stable reflection point flag. Note that the stable reflection point extraction unit 190 is a component that can also be inserted posterior to the SAR image shaping unit 110 of the image analysis device 101 of the second exemplary embodiment and the SAR image shaping unit 110 of the image analysis device 102 of the third exemplary embodiment.

[Description of Operation]

Figure 20:
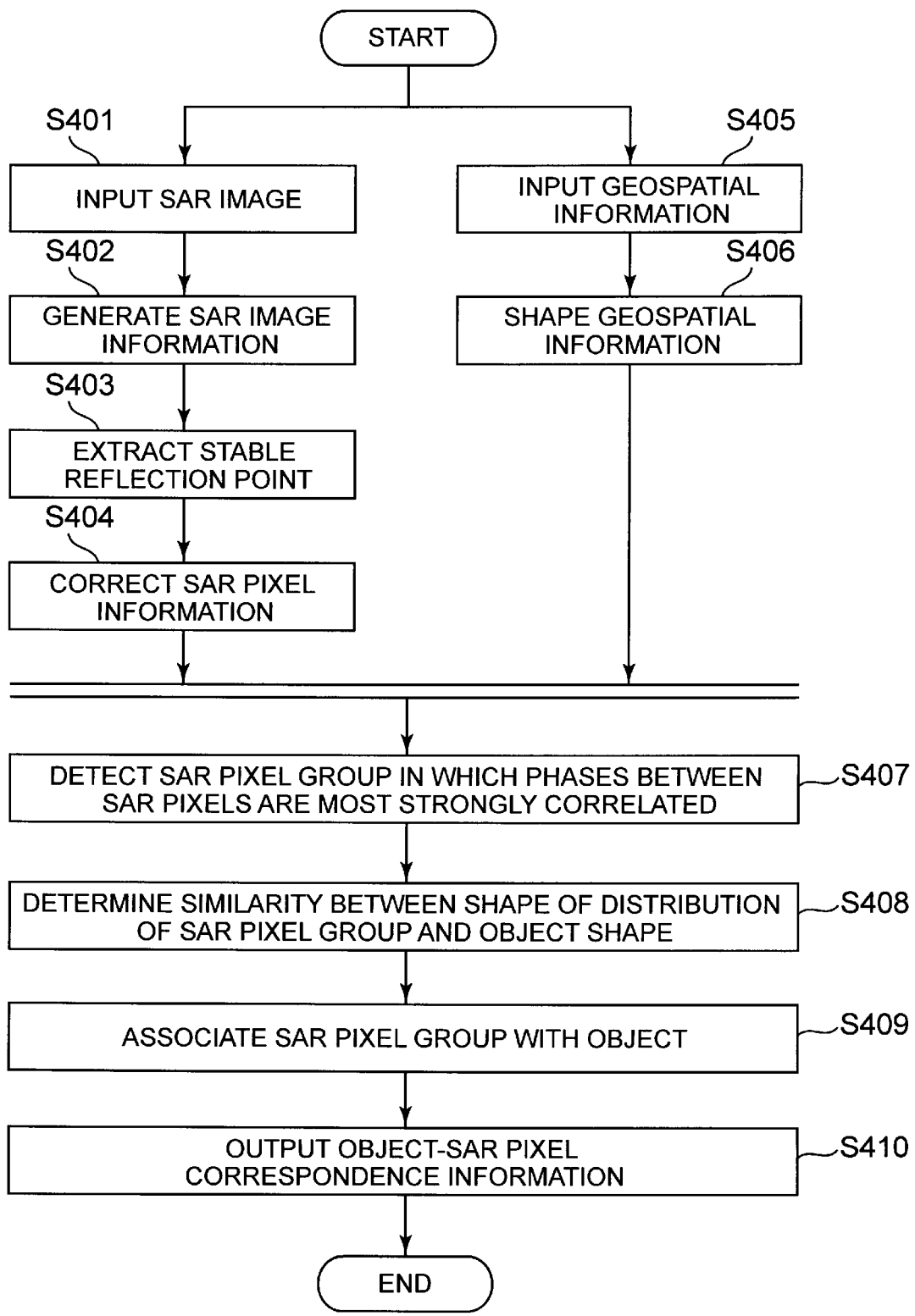
FIG. 20 is a flowchart showing the operation of the SAR pixel association process by the image analysis device 103 of the fourth exemplary embodiment.

The operation of associating the SAR pixels with an object of the image analysis device 103 of the present exemplary embodiment will be described below with reference to FIG. 20. FIG. 20 is a flowchart showing the operation of the SAR pixel association process by the image analysis device 103 of the fourth exemplary embodiment.

The process in step S401 is the same as that in step S101 shown in FIG. 10.

The SAR image shaping unit 110 generates SAR image information and SAR pixel information on the basis of the plurality of inputted SAR images. The SAR image shaping unit 110 inputs the generated SAR image information and SAR pixel information to the stable reflection point extraction unit 190 (step S402).

The stable reflection point extraction unit 190 then extracts, as stable reflection points, SAR pixels having stable luminance and phase from the inputted SAR image (step S403).

The stable reflection point extraction unit 190 then corrects the inputted SAR pixel information on the basis of the extracted stable reflection point (step S404). The stable reflection point extraction unit 190 inputs the corrected SAR pixel information to the pixel classification unit 130.

The processes in steps S405 to S410 are the same as those in steps S103 to S108 shown in FIG. 10.

[Description of Effects]

The image analysis device 103 of the present exemplary embodiment can associate a SAR pixel group with an object without being affected by noise. The reason for the association is that the pixel classification unit 130 does not have to deal with pixels whose luminance and phase are unstable due to the influence of noise by specifying the stable reflection point by the stable reflection point extraction unit 190, so that the evaluation result such as the evaluation result of correlation is prevented from being inaccurate due to the influence of noise.

Fifth Exemplary Embodiment

[Description of Configuration]

Figure 21:
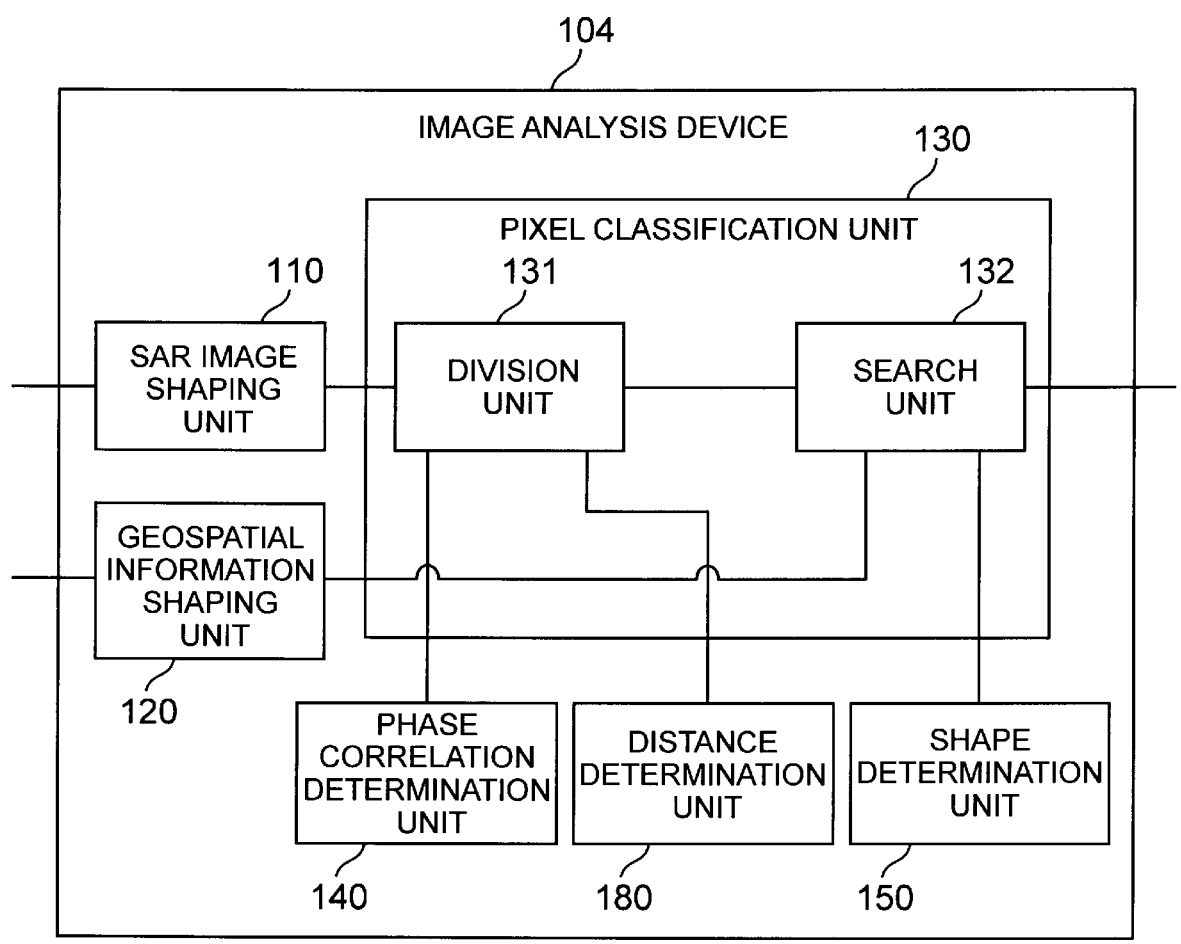
FIG. 21 is a block diagram showing a configuration example of an image analysis device 104 of a fifth exemplary embodiment.

A fifth exemplary embodiment of the present invention will now be described with reference to the drawings. FIG. 21 is a block diagram showing a configuration example of an image analysis device 104 of the fifth exemplary embodiment.

The pixel classification unit 130 of the image analysis device 104 shown in FIG. 21 includes a division unit 131 and a search unit 132. The configuration of the image analysis device 104 other than the configuration of the pixel classification unit 130 is the same as that of the image analysis device 102. Note that the image analysis device 104 may not include the distance determination unit 180.

As shown in FIG. 21, the division unit 131 is connected to the SAR image shaping unit 110, the phase correlation determination unit 140, and the distance determination unit 180. The search unit 132 is connected to the geospatial information shaping unit 120, the division unit 131, and the shape determination unit 150. The division unit 131 can input data to the search unit 132. The search unit 132 can also input data to the division unit 131.

The division unit 131 has a function of receiving, as an input, the output of the SAR image shaping unit 110 and dividing the SAR pixel group into pixel groups whose phases are strongly correlated. When the image analysis device 104 includes the distance determination unit 180, the division unit 131 may divide the SAR pixel groups into pixel groups whose phases are strongly correlated and positions are close to each other.

The division unit 131 can execute the division by using a method described in, for example, NPL 1. The division unit 131 can also execute the division by using a technique called Kernel K-means.

Specifically, the division unit 131 defines a Kernel function, which is a function for computing the similarity used in the Kernel K-means, as a product of the output of the phase correlation determination unit 140 and the output of the distance determination unit 180. Defining the Kernel function as the product of both outputs enables the division unit 131 to divide the SAR pixel group so that the SAR pixels constituting the divided SAR pixel group have strong phase correlation and the positions of the SAR pixels are close to each other.

The division unit 131 may use a clustering method using a graph, such as Normalized Cut or Spectral Clustering, for the division. Specifically, the division unit 131 generates a graph in which each node is a SAR pixel and each edge is a weight. The generated graph represents, for example, the product of the output of the phase correlation determination unit 140 and the output of the distance determination unit 180.

Applying a graph division algorithm such as Normalized Cut or Spectral Clustering to the generated graph enables the division unit 131 to divide the SAR pixel group so that the SAR pixels constituting the divided SAR pixel group have strong phase correlation and the positions of the SAR pixels are close to each other.

In addition, when the image analysis device 104 of the present exemplary embodiment includes the distance determination unit 180, the distance determination unit 180 may evaluate the distance after multiplying the computed distance by a magnification corresponding to the size of the object, for example. In other words, when evaluating a pixel displaying a large object, the distance determination unit 180 may multiply the computed distance by a magnification smaller than 1 when computing the distance from another pixel in order to relax the constraint on the distance between pixels.

The search unit 132 has a function of receiving, as inputs, the SAR pixel group obtained by the division unit 131 and the geospatial information indicating the shape and position of each object outputted by the geospatial information shaping unit 120, and searching for objects most similar in shape to the shape of the distribution for each of the SAR pixel groups.

The search unit 132 assigns all SAR pixels constituting the SAR pixel group to an object most similar in shape to the shape of the distribution. In other words, the search unit 132 generates the object-SAR pixel correspondence information and outputs the generated object-SAR pixel correspondence information.

[Description of Operation]

Figure 22:
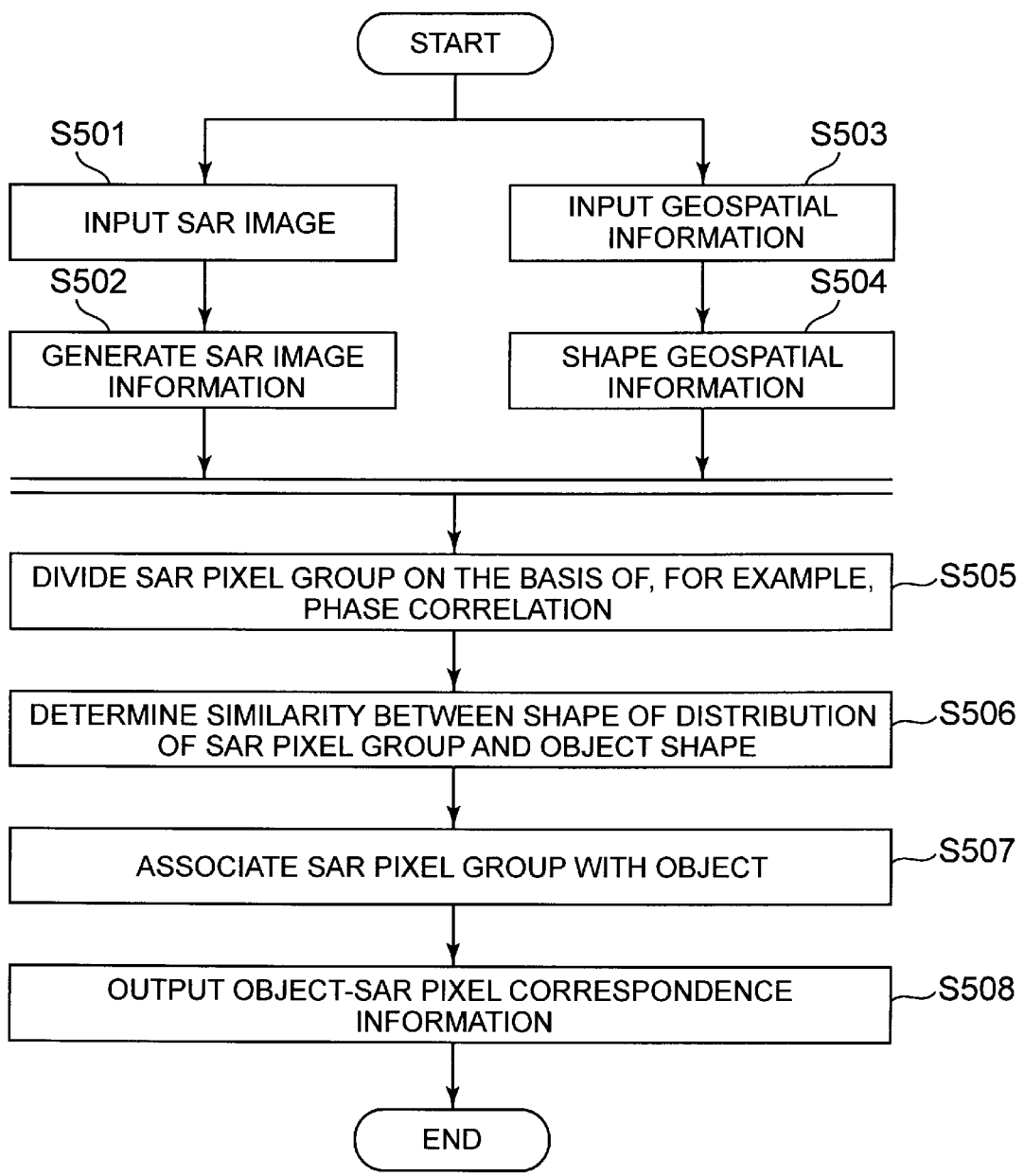
FIG. 22 is a flowchart showing the operation of the SAR pixel association process by the image analysis device 104 of the fifth exemplary embodiment.

The operation of associating the SAR pixels with an object of the image analysis device 104 of the present exemplary embodiment will be described below with reference to FIG. 22. FIG. 22 is a flowchart showing the operation of the SAR pixel association process by the image analysis device 104 of the fifth exemplary embodiment.

The processes in steps S501 to S504 are the same as those in steps S101 to S104 shown in FIG. 10.

The phase correlation determination unit 140 determines an evaluation value of a phase correlation between SAR pixels constituting a SAR pixel group indicated by SAR pixel information. The division unit 131 then refers to the evaluation value of the phase correlation determined by the phase correlation determination unit 140, and divides the SAR pixel group of the inputted SAR image (step S505).

The shape determination unit 150 then determines the similarity between the shape of each object indicated by the geospatial information and the shape of the distribution of the SAR pixel group divided in the step S505 (step S506).

On the basis of the determined similarity, the search unit 132 then searches for a SAR pixel group having the most similar shape of the distribution to the object shape, from among the SAR pixel groups divided by the division unit 131 for each object indicated by the geospatial information. The search unit 132 associates the SAR pixels constituting the searched SAR pixel group with the object (step S507).

The search unit 132 then generates object-SAR pixel correspondence information indicating the associated SAR pixel group and the object. The search unit 132 outputs the generated object-SAR pixel correspondence information (step S508). After the output, the image analysis device 104 ends the SAR pixel association process.

[Description of Effects]

The image analysis device 104 of the present exemplary embodiment can associate SAR pixels with objects indicated by geospatial information by using a clustering method. The reason for the association is that the division unit 131 divides the SAR pixel group by using a clustering method, and the search unit 132 associates the divided SAR pixel group with the object.

Sixth Exemplary Embodiment

[Description of Configuration]

Figure 23:
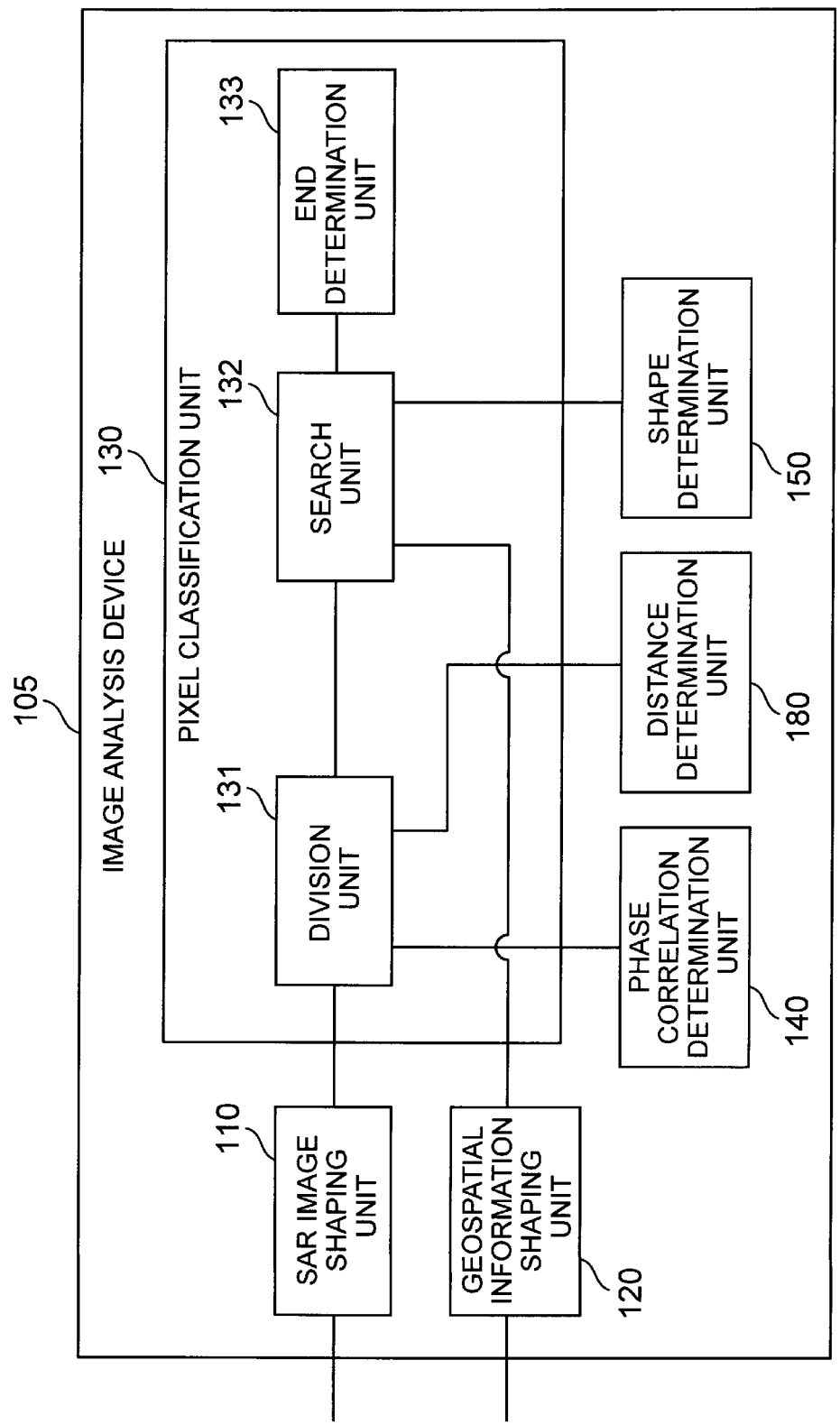
FIG. 23 is a block diagram showing a configuration example of an image analysis device 105 of a sixth exemplary embodiment.

A sixth exemplary embodiment of the present invention will now be described with reference to the drawings. FIG. 23 is a block diagram showing a configuration example of an image analysis device 105 of the sixth exemplary embodiment.

The pixel classification unit 130 of the image analysis device 105 shown in FIG. 23 includes the division unit 131, the search unit 132, and an end determination unit 133. As shown in FIG. 23, the end determination unit 133 is connected to the search unit 132.

The configuration of the image analysis device 105 other than the end determination unit 133 is the same as that of the image analysis device 104. Note that the image analysis device 105 may not include the distance determination unit 180.

The division unit 131 of the present exemplary embodiment also has a function of receiving, as an input, the output of the SAR image shaping unit 110 and dividing the SAR pixel group into pixel groups whose phases are strongly correlated. When the image analysis device 105 includes the distance determination unit 180, the division unit 131 may divide the SAR pixel groups into pixel groups whose phases are strongly correlated and positions are close to each other.

The search unit 132 of the present exemplary embodiment also has a function of receiving, as inputs, the SAR pixel group obtained by the division unit 131 and the geospatial information indicating the shape and position of each object outputted by the geospatial information shaping unit 120, and searching for objects most similar in shape to the shape of the distribution for each of the SAR pixel groups.

The search unit 132 assigns all SAR pixels constituting the SAR pixel group to an object most similar in shape to the shape of the distribution. In other words, the search unit 132 generates the object-SAR pixel correspondence information and outputs the generated object-SAR pixel correspondence information.

When the search unit 132 has already associated the SAR pixels with the objects indicated by the geospatial information, the division unit 131 of the present exemplary embodiment redivides the SAR pixel group on the basis of the object-SAR pixel correspondence information.

The division unit 131 redivides the SAR pixel group on the basis of the information indicating the SAR pixel group associated with each object obtained by the search unit 132. When redividing, the division unit 131 may change the parameters of the algorithm used in the division according to the object to which the pixel group is assigned.

For example, the division unit 131 may redivide the SAR pixel group so that the SAR pixels constituting all the SAR pixel groups associated with the identical object by the search unit 132 belong to the same SAR pixel groups after the redivision.

The end determination unit 133 has a function of determining whether to end the redivision of the SAR pixel group by the division unit 131. In the determination, the end determination unit 133 may use the end condition of the redivision based on the phase correlation and the similarity in shape.

For example, when the pixels assigned to the respective objects do not have the strength of phase correlation of a predetermined value or more, the end determination unit 133 may determine to continue the redivision. In addition, when the shape of the distribution of the pixel group to which the assigned pixel belongs is not sufficiently similar to the object shape, the end determination unit 133 may determine to continue the redivision.

The end determination unit 133 may also use an end condition based on the number of redivisions. For example, if the number of redivisions exceeds a predetermined number, the end determination unit 133 may determine to end the redivision.

[Description of Operation]

Figure 24:
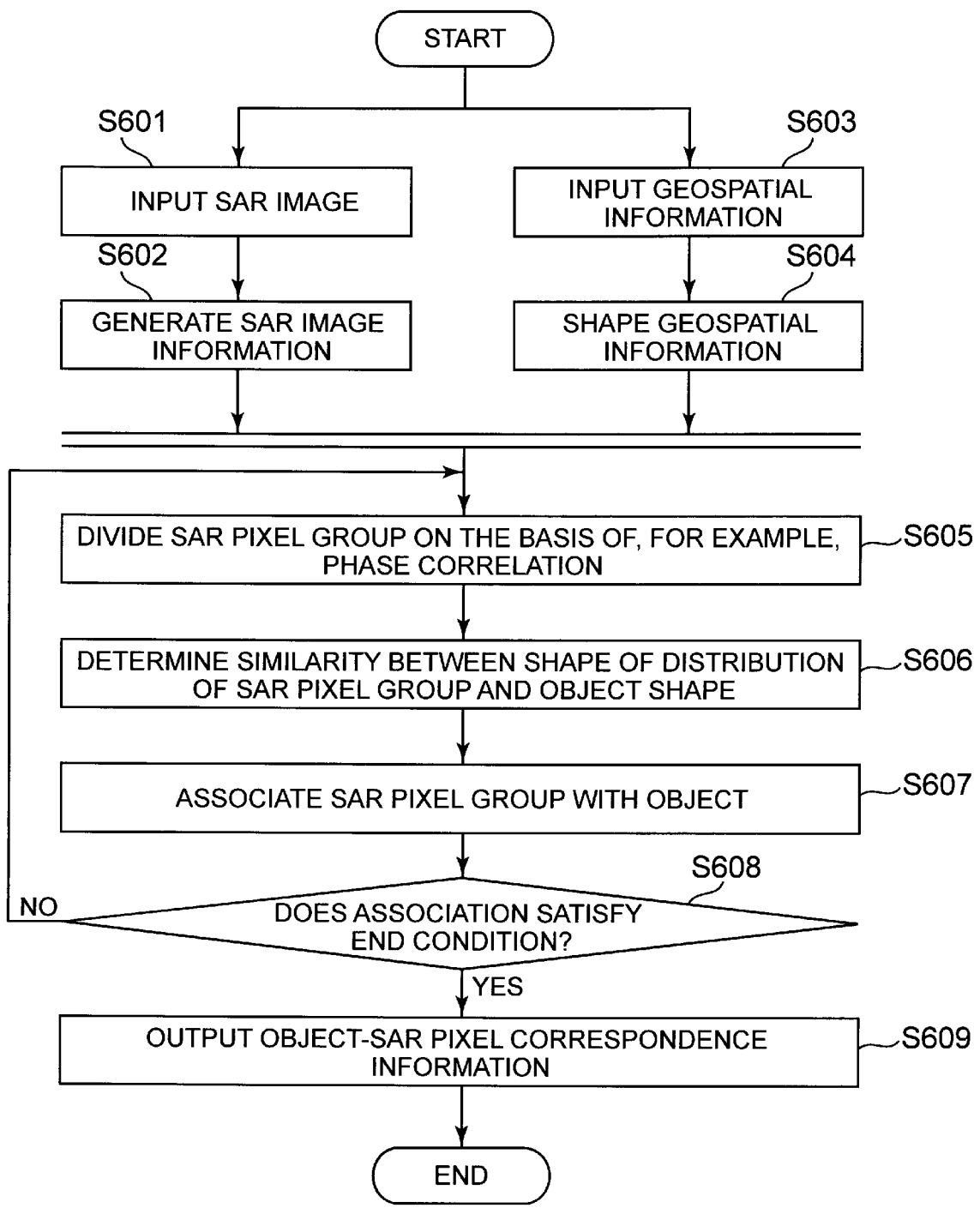
FIG. 24 is a flowchart showing the operation of the SAR pixel association process by the image analysis device 105 of the sixth exemplary embodiment.

The operation of associating the SAR pixels with an object of the image analysis device 105 of the present exemplary embodiment will be described below with reference to FIG. 24. FIG. 24 is a flowchart showing the operation of the SAR pixel association process by the image analysis device 105 of the sixth exemplary embodiment.

The processes in steps S601 to S604 are the same as those in steps S101 to S104 shown in FIG. 10.

The phase correlation determination unit 140 determines an evaluation value of a phase correlation between SAR pixels constituting a SAR pixel group indicated by SAR pixel information. The division unit 131 then refers to the evaluation value of the phase correlation determined by the phase correlation determination unit 140, and divides the SAR pixel group of the inputted SAR image (step S605).

The shape determination unit 150 determines the similarity between the shape of each object indicated by the geospatial information and the shape of the distribution of the SAR pixel group divided in the step S605 (step S606).

On the basis of the determined similarity, the search unit 132 then searches for a SAR pixel group having the most similar shape of the distribution to the object shape, from among the SAR pixel groups divided by the division unit 131 for each object indicated by the geospatial information. The search unit 132 associates the SAR pixels constituting the searched SAR pixel group with the object (step S607).

The end determination unit 133 then determines whether the end condition of the redivision is satisfied (step S608). If the end condition of the redivision is not satisfied (No in the step S608), the division unit 131 performs the process in the step S605 again.

If the end condition of the redivision is satisfied (Yes in the step S608), the search unit 132 generates object-SAR pixel correspondence information indicating the associated SAR pixel group and the object. The search unit 132 outputs the generated object-SAR pixel correspondence information (step S609). After the output, the image analysis device 105 ends the SAR pixel association process.

[Description of Effects]

The pixel classification unit 130 of the image analysis device 105 of the present exemplary embodiment performs the association until both the strength of phase correlation and the similarity in shape satisfy a specified condition by repeatedly executing the division of the SAR pixel group. In other words, the image analysis device 105 can output improved object-SAR pixel correspondence information by repeatedly executing cluster redivisions and combinations.

Seventh Exemplary Embodiment

[Description of Configuration]

Figure 25:
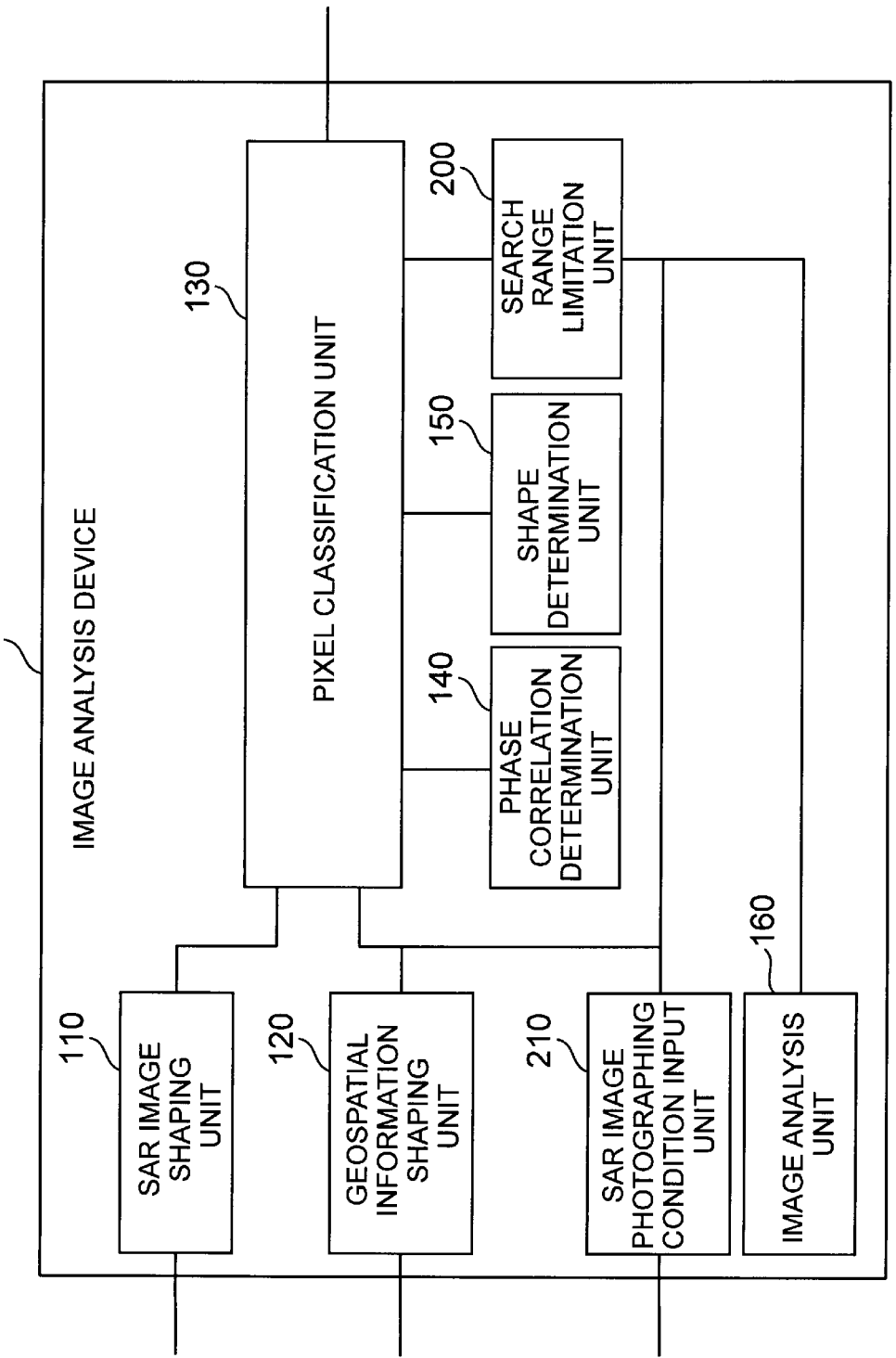
FIG. 25 is a block diagram showing a configuration example of an image analysis device 106 of a seventh exemplary embodiment.

A seventh exemplary embodiment of the present invention will now be described with reference to the drawings. FIG. 25 is a block diagram showing a configuration example of an image analysis device 106 of the seventh exemplary embodiment.

The image analysis device 106 shown in FIG. 25 differs from the image analysis device 100 shown in FIG. 2 in that the image analysis device 106 includes a search range limitation unit 200, a SAR image photographing condition input unit 210, and the image analysis unit 160.

The configuration of the image analysis device 106 other than the search range limitation unit 200, the SAR image photographing condition input unit 210, and the image analysis unit 160 is the same as that of the image analysis device 100. Note that the image analysis device 106 may not include the SAR image photographing condition input unit 210 and the image analysis unit 160.

Similarly to the image analysis unit 160 of the second exemplary embodiment, the image analysis unit 160 of the present exemplary embodiment has a function of computing, for example, the elevation data from the SAR image such that the image analysis unit described in PTL 2 has the similar function.

A photographing condition of each SAR image inputted to the image analysis device 106 is inputted to the SAR image photographing condition input unit 210. The inputted photographing conditions indicate the direction of photographing, and the orbit of the SAR image photographing apparatus 600 for photographing the image, for example.

The search range limitation unit 200 has a function of converting a position on the basis of elevation data in each SAR pixel, and photographing conditions of the SAR image, for example. For example, the search range limitation unit 200 converts the position of each SAR pixel displayed in the coordinate system of the inputted SAR image (in particular, the reference image) into the position displayed in the coordinate system indicated by the inputted geospatial information.

The search range limitation unit 200 also converts the position of each object displayed in the coordinate system indicated by the inputted geospatial information into the position displayed in the coordinate system of the inputted SAR image (in particular, the reference image).

The search range limitation unit 200 may acquire the elevation data in each SAR pixel from a map or data in which the elevation at each location is recorded, or may acquire the elevation data using the SAR image analysis method described in PTL 2. Note that the data in which the elevation at each location is recorded are DEM, DTM (Digital Terrain Model), and DSM (Digital Surface Model), for example.

The position of the object is roughly associated with the position of the SAR pixel by converting the position by the search range limitation unit 200. The search range limitation unit 200 inputs the periphery of each position roughly associated by the conversion to the pixel classification unit 130. The pixel classification unit 130 limits, to the periphery of each inputted position, a range for searching the set of objects and SAR pixel groups that have similar shapes.

The search range limitation unit 200 may also compute the search range by referring to the SAR image photographing conditions inputted from the SAR image photographing condition input unit 210, and the elevation data of each SAR pixel inputted from the image analysis unit 160, for example.

The pixel classification unit 130 includes, in a computation set, SAR pixel groups in which the phases between the constituent SAR pixels are most strongly correlated from the search range specified by the search range limitation unit 200. Further, the pixel classification unit 130 searches for an object having a shape most similar to the shape of the distribution of the SAR pixel groups included in the set from the search range specified by the search range limitation unit 200.

As in the fifth exemplary embodiment, the pixel classification unit 130 may also divide the SAR pixel group and associate an object having a shape most similar to the shape of the distribution of each divided pixel group with the pixel group.

[Description of Operation]

Figure 26:
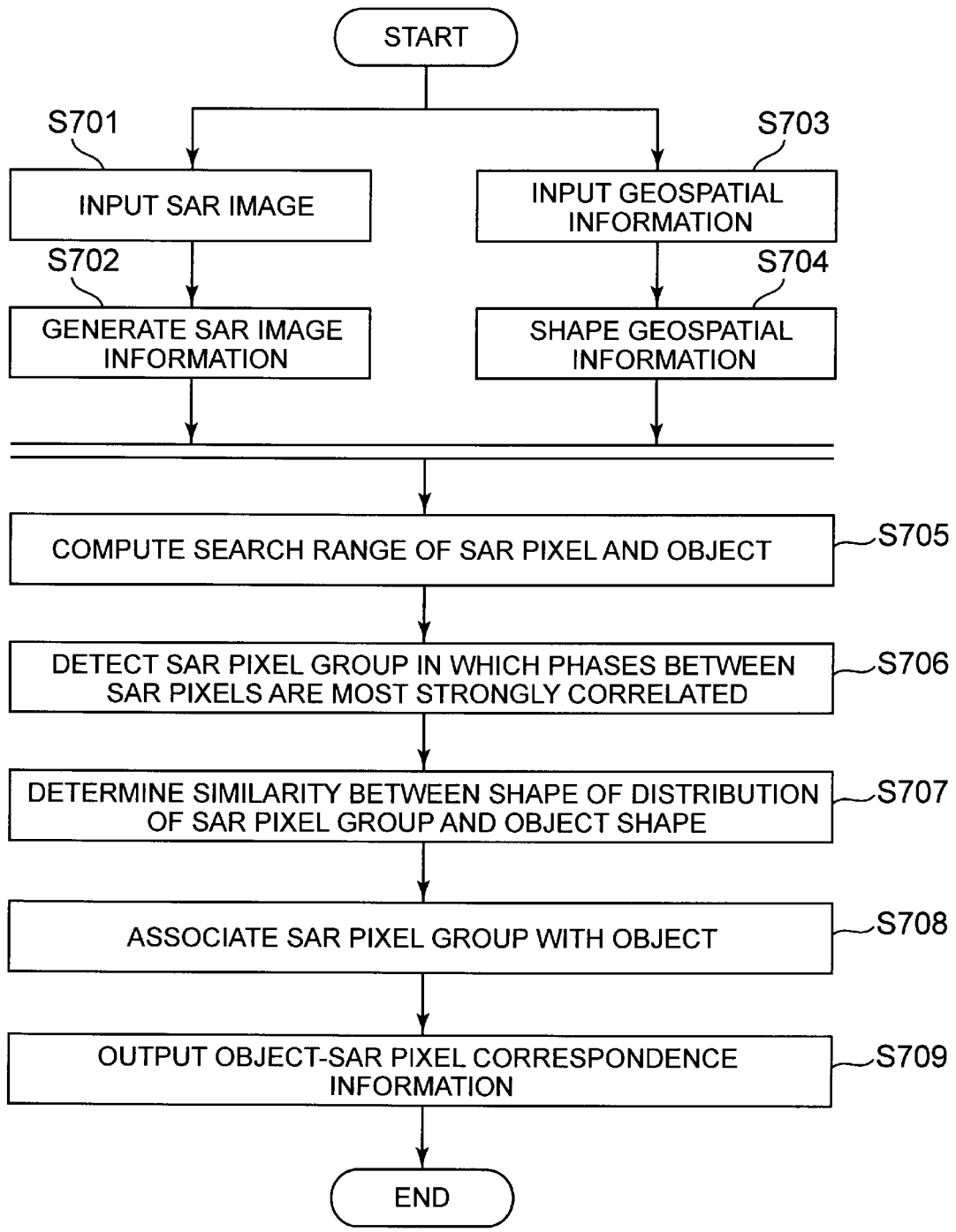
FIG. 26 is a flowchart showing the operation of the SAR pixel association process by the image analysis device 106 of the seventh exemplary embodiment.

The operation of associating the SAR pixels with an object of the image analysis device 106 of the present exemplary embodiment will be described below with reference to FIG. 26. FIG. 26 is a flowchart showing the operation of the SAR pixel association process by the image analysis device 106 of the seventh exemplary embodiment.

The processes in steps S701 to S704 are the same as those in steps S101 to S104 shown in FIG. 10.

After the input of the SAR image information and the SAR pixel information and the input of the geospatial information are completed, the pixel classification unit 130 causes the phase correlation determination unit 140 and the shape determination unit 150 to determine the strength of phase correlation between the SAR pixels and the similarity in shape, respectively. The pixel classification unit 130 also causes the search range limitation unit 200 to limit the search range.

The search range limitation unit 200 first computes a search range of the SAR pixel group and a search range of the object, respectively, on the basis of the inputted geospatial information (step S705).

The phase correlation determination unit 140 then detects, from the computed search range, a SAR pixel group in which the phases between the constituent SAR pixels are most strongly correlated among the SAR pixel groups indicated by the SAR pixel information (step S706).

The shape determination unit 150 then determines the similarity between the shape of each object in the computed search range indicated by the geospatial information and the shape of the distribution of the SAR pixel group detected in the step S706 (step S707).

The processes in steps S708 to S709 are the same as those in steps S107 to S108 shown in FIG. 10.

[Description of Effects]

The image analysis device 106 of the present exemplary embodiment can associate objects and SAR pixels with each other at a higher speed, since the search range limitation unit 200 limits the search range. Further, the image analysis device 106 can prevent the SAR pixel group from being erroneously associated with an object having a shape similar to the shape of the distribution existing at completely unrelated locations, since the search range limitation unit 200 limits the search range. In other words, the image analysis device 106 can improve the accuracy of the association itself by limiting each search range of the SAR pixel group and the object that have similar shapes.

Eighth Exemplary Embodiment

[Description of Configuration]

An eighth exemplary embodiment of the present invention will now be described with reference to the drawings.

Figure 27:
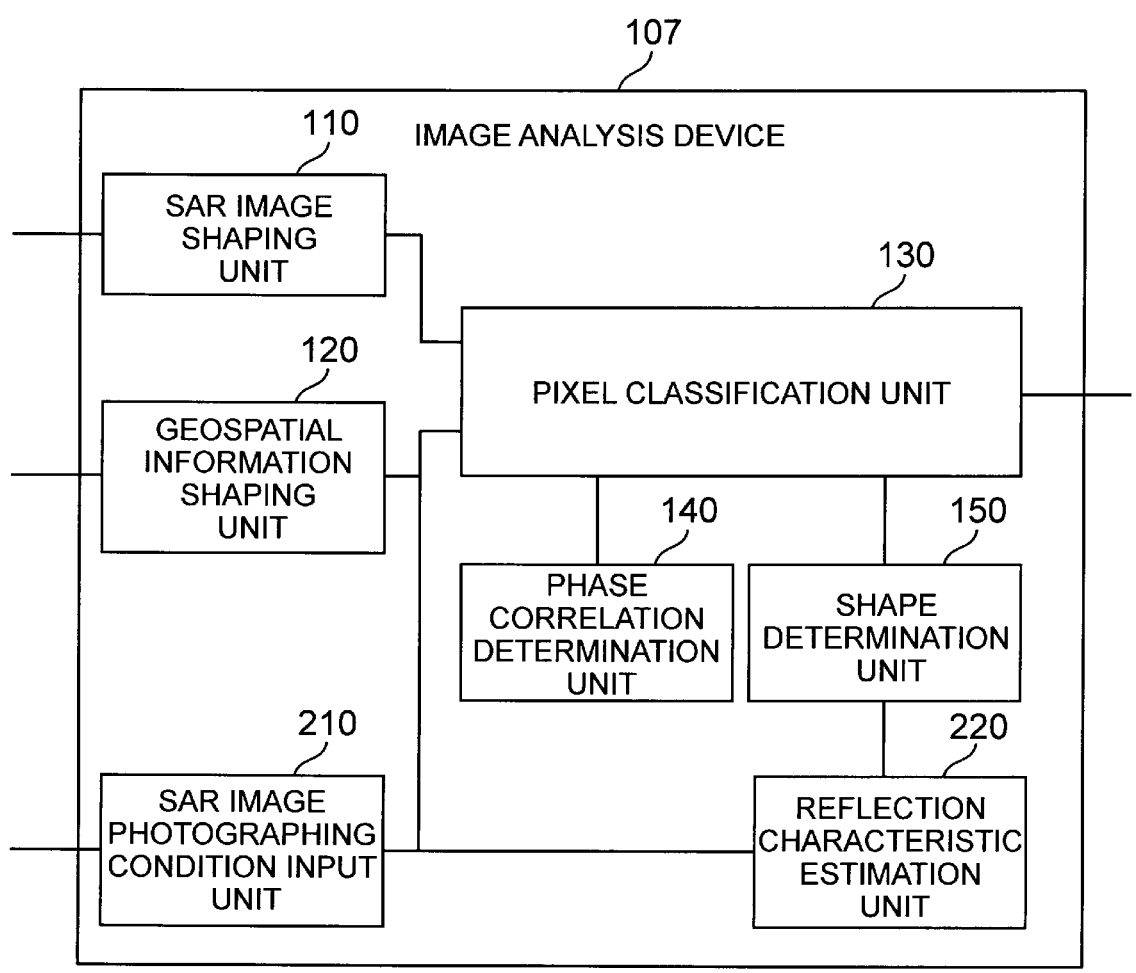
FIG. 27 is a block diagram showing a configuration example of an image analysis device 107 of an eighth exemplary embodiment.

FIG. 27 is a block diagram showing a configuration example of an image analysis device 107 of the eighth exemplary embodiment.

The image analysis device 107 shown in FIG. 27 differs from the image analysis device 100 shown in FIG. 2 in that the image analysis device 107 includes a SAR image photographing condition input unit 210 and a reflection characteristic estimation unit 220. The configuration of the image analysis device 107 other than the SAR image photographing condition input unit 210 and the reflection characteristic estimation unit 220 is the same as that of the image analysis device 100.

As shown in FIG. 27, the shape determination unit 150 is connected to the reflection characteristic estimation unit 220. Note that the image analysis device 107 may not include the SAR image photographing condition input unit 210.

The reflection characteristic estimation unit 220 receives geospatial information as an input from the geospatial information shaping unit 120. On the basis of the inputted geospatial information, the reflection characteristic estimation unit 220 has a function of estimating the degree of intensity at which each portion of each object reflects electromagnetic waves, that is, the reflection characteristic.

In the estimation, the reflection characteristic estimation unit 220 may receive the SAR image photographing condition as an input from the SAR image photographing condition input unit 210, and estimate the reflection characteristic of the electromagnetic wave according to the inputted photographing condition.

A photographing condition of each SAR image inputted to the image analysis device 107 is inputted to the SAR image photographing condition input unit 210. The inputted photographing conditions indicate the direction of photographing, and the orbit of the SAR image photographing apparatus 600 for photographing the image, for example.

The shape determination unit 150 considers the reflection characteristics estimated by the reflection characteristic estimation unit 220 when determining the similarity in shape.

FIG. 28 is an explanatory diagram showing an example of a photographing condition inputted from the SAR image photographing condition input unit 210. For example, considered is a case where the SAR image photographing apparatus 600 photographs a building and a road under the photographing conditions shown in FIG. 28.

The "oblique view" shown in FIG. 28 shows the three-dimensional arrangement of the SAR image photographing apparatus 600, a road surface, and a building. In the "top view" shown in FIG. 28 with respect to the photographing state, the electromagnetic wave irradiated from the SAR image photographing apparatus 600 is indicated by a white arrow.

In the case of the photographing conditions shown in FIG. 28, the wall surface of the building located on the incident direction side is likely to strongly reflect electromagnetic waves. Curbstones generally placed at the side of roads are also likely to strongly reflect electromagnetic waves. In addition, the road surface is unlikely to strongly reflect electromagnetic waves. Areas that are blocked by buildings and cannot receive electromagnetic waves do not reflect any electromagnetic waves.

On the basis of the properties described above, the reflection characteristic estimation unit 220 can estimate the degree of intensity at which each portion of each object as shown in FIG. 29 reflects electromagnetic waves, on the basis of geospatial information such as maps and aerial photographs. FIG. 29 is an explanatory diagram showing an example of the estimated value of the reflection characteristic outputted by the reflection characteristic estimation unit 220.

The left of FIG. 29 shows the estimated value of the reflection characteristic of the road, which is the value of the reflection characteristic with respect to the road. The area A shown in the left of FIG. 29, in which white dots are provided on a black background, is an area of a road surface that weakly reflects electromagnetic waves. The white area B surrounding the road is a curbstone area that strongly reflects electromagnetic waves.

Note that black areas existing in a part of the road surface and areas surrounding the road shown in the left of FIG. 29 are areas which are blocked by the buildings and cannot reflect electromagnetic waves at all.

The right of FIG. 29 shows the estimated value of the reflection characteristic of the building, which is the value of the reflection characteristic of the building. The area C shown in the right of FIG. 29, in which relatively sparse black dots are provided on a white background, is an area that strongly reflects electromagnetic waves due to the influence of the wall surface of the building.

Further, the area D shown in the right of FIG. 29, in which relatively dense black dots are provided on a white background, is an area in which electromagnetic waves are reflected weaker than the area C but stronger than the road surface due to the influence of the ceiling of the building. In addition, it is estimated that reflected waves from the walls of buildings and from the ceilings of buildings are accompanied by distortions specific to SAR.

When evaluating the similarity of the shapes of the distributions, the shape determination unit 150 weights, for example, a strongly reflected portion or a portion having little noise in the reflected wave, on the basis of the reflection characteristics estimated by the reflection characteristic estimation unit 220. After weighting the portion of the object, the shape determination unit 150 determines the similarity between the object shape and the shape of the distribution of the SAR pixel group.

[Description of Operation]

Figure 30:
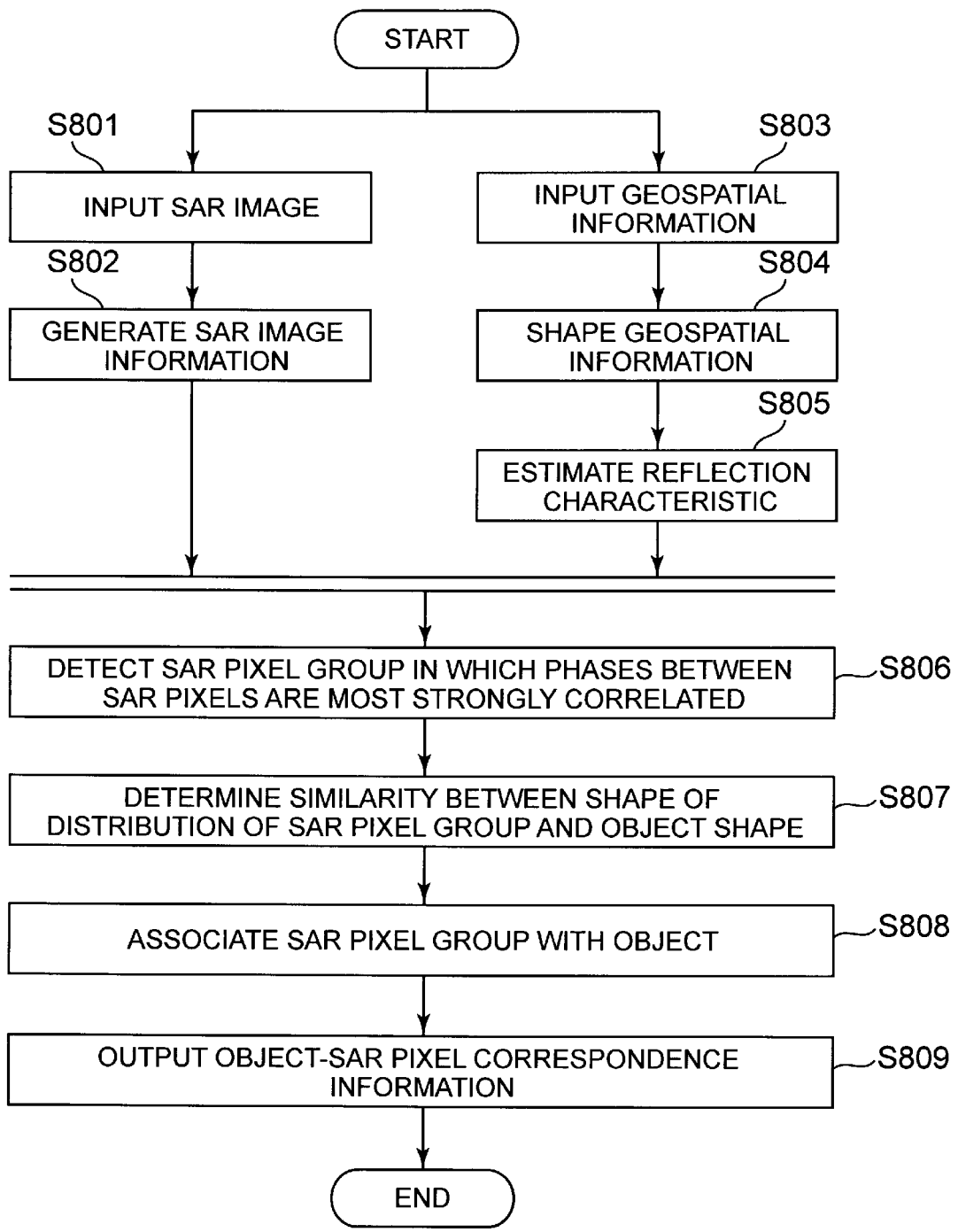
FIG. 30 is a flowchart showing the operation of the SAR pixel association process by the image analysis device 107 of the eighth exemplary embodiment.

The operation of associating the SAR pixels with an object of the image analysis device 107 of the present exemplary embodiment will be described below with reference to FIG. 30. FIG. 30 is a flowchart showing the operation of the SAR pixel association process by the image analysis device 107 of the eighth exemplary embodiment.

The processes in steps S801 to S803 are the same as those in steps S101 to S103 shown in FIG. 10.

The geospatial information shaping unit 120 shapes the inputted geospatial information into a predetermined format (step S804). The geospatial information shaping unit 120 then inputs the shaped geospatial information to the pixel classification unit 130 and the reflection characteristic estimation unit 220.

The reflection characteristic estimation unit 220 then estimates the reflection characteristic of each object indicated by the geospatial information on the basis of the inputted geospatial information (step S805).

In estimating the reflection characteristic, the reflection characteristic estimation unit 220 may estimate the reflection characteristic with reference to the SAR image photographing condition inputted from the SAR image photographing condition input unit 210. The reflection characteristic estimation unit 220 inputs the estimated reflection characteristic to the shape determination unit 150.

The processes in steps S806 to S809 are the same as those in steps S105 to S108 shown in FIG. 10.

[Description of Effects]

The reflection characteristic estimation unit 220 of the present exemplary embodiment receives the geospatial information as an input from the geospatial information shaping unit 120, and estimates the degree of intensity at which each portion of each object reflects electromagnetic waves. The reflection characteristic estimation unit 220 can estimate the intensity with which each portion of each object reflects electromagnetic waves using information such as the shape and material of the object.

The image analysis device 107 intensively evaluates the shape of a portion of an object which strongly reflects electromagnetic waves and is hardly affected by noise, by using the reflection characteristics estimated by the reflection characteristic estimation unit 220 on the basis of map information, for example. Therefore, the image analysis device 107 can more accurately associate the object indicated by the geospatial information with the SAR pixel.

Ninth Exemplary Embodiment

[Description of Configuration]

Figure 31:
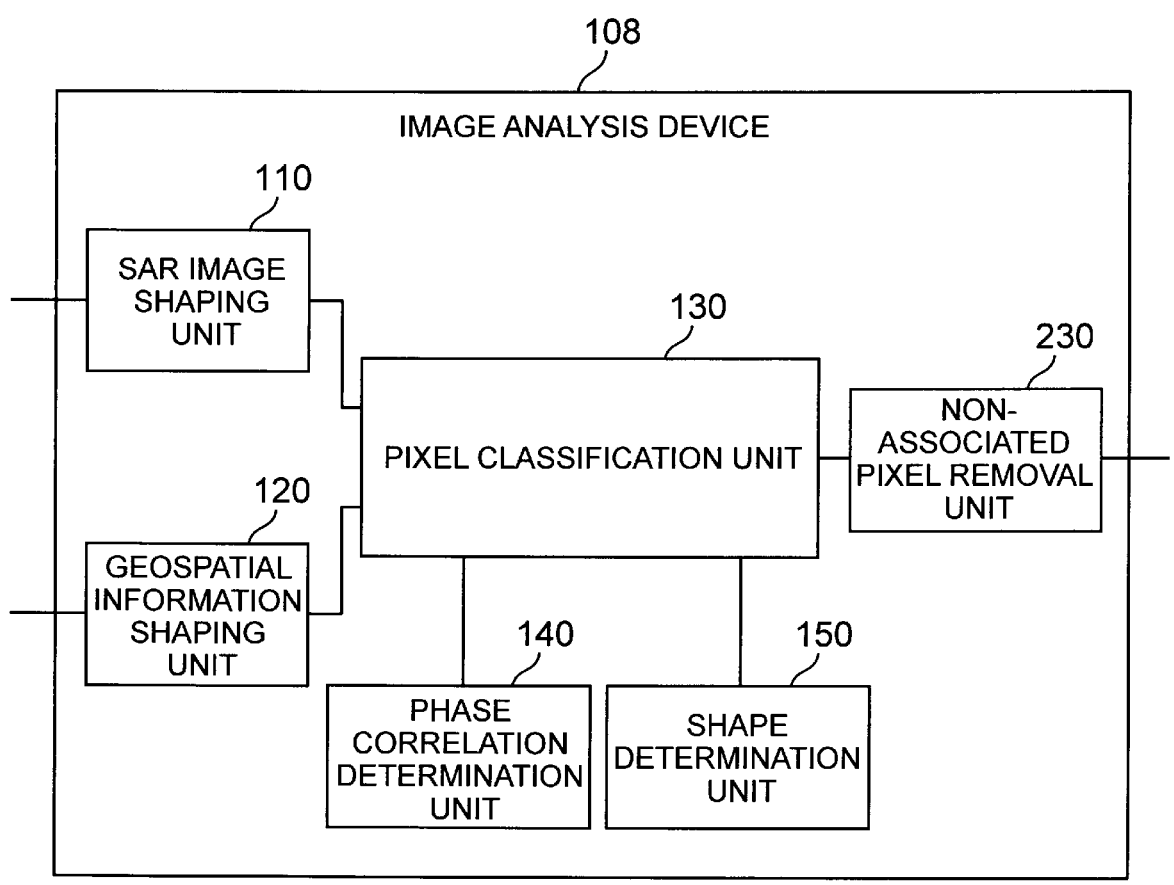
FIG. 31 is a block diagram showing a configuration example of an image analysis device 108 of a ninth exemplary embodiment.

A ninth exemplary embodiment of the present invention will now be described with reference to the drawings. FIG. 31 is a block diagram showing a configuration example of an image analysis device 108 of the ninth exemplary embodiment.

The image analysis device 108 shown in FIG. 31 differs from the image analysis device 100 shown in FIG. 2 in that the image analysis device 108 includes a non-associated pixel removal unit 230. The configuration of the image analysis device 108 other than the non-associated pixel removal unit 230 is the same as that of the image analysis device 100.

The non-associated pixel removal unit 230 is connected to the pixel classification unit 130. The non-associated pixel removal unit 230 has a function of removing SAR pixels that are not associated with the object by the pixel classification unit 130. The non-associated pixel removal unit 230 removes the SAR pixel for which the associated appropriate object is not found.

As a result of the determination of the strength of phase correlation and the determination of the similarity in shape by the pixel classification unit 130 using the phase correlation determination unit 140 and the shape determination unit 150, the SAR pixel group which is not associated with the object may be detected because the phase correlation between the SAR pixels is weak or the shapes are not sufficiently similar.

The non-associated pixel removal unit 230 removes the SAR pixel group not associated with the object from the SAR image. The image analysis device 108 of the present exemplary embodiment outputs information indicating the result of association between the SAR pixel group other than the SAR pixel group not associated with the object and the object.

[Description of Operation]

Figure 32:
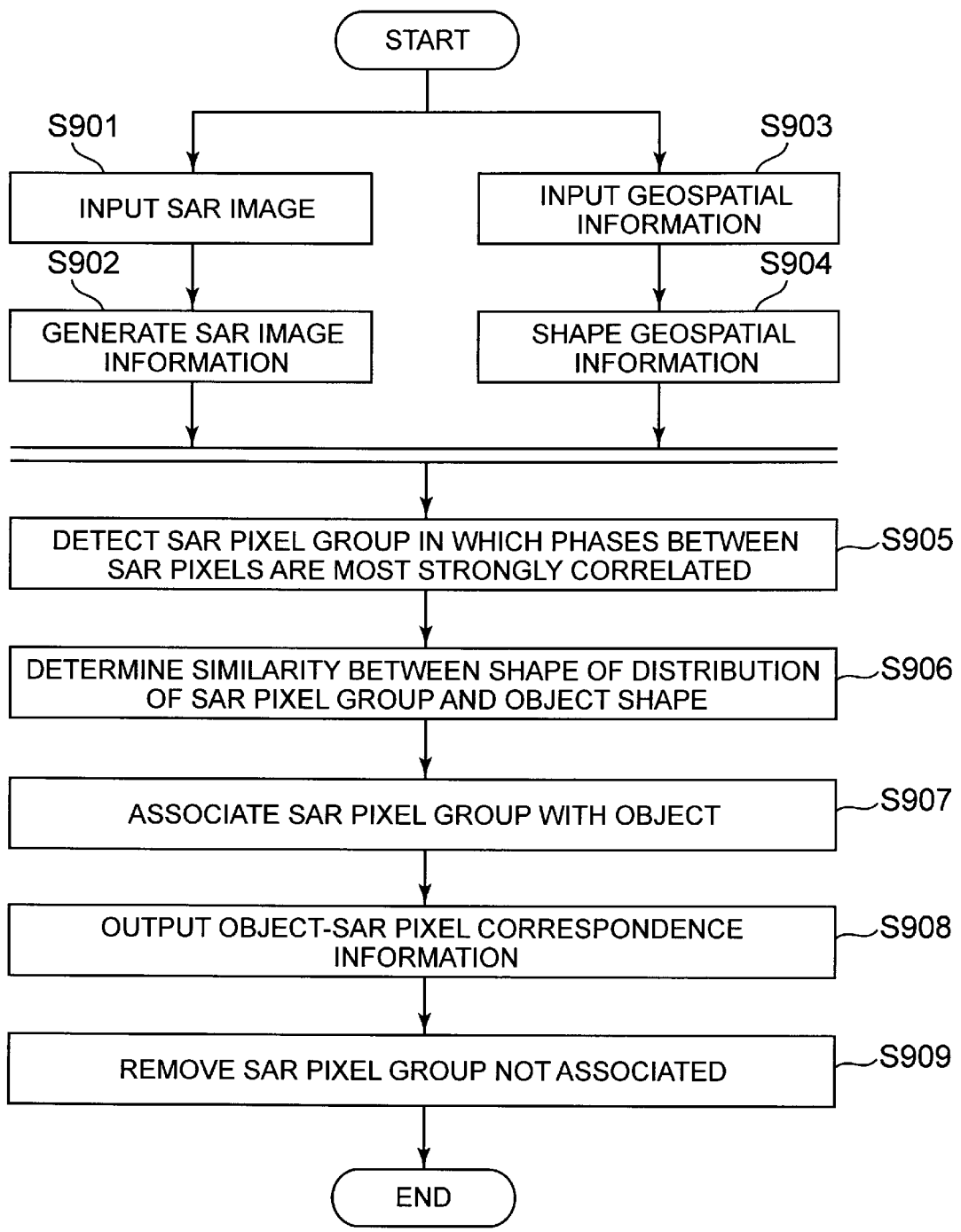
FIG. 32 is a flowchart showing the operation of the SAR pixel association process by the image analysis device 108 of the ninth exemplary embodiment.

The operation of associating the SAR pixels with an object of the image analysis device 108 of the present exemplary embodiment will be described below with reference to FIG. 32. FIG. 32 is a flowchart showing the operation of the SAR pixel association process by the image analysis device 108 of the ninth exemplary embodiment.

The processes in steps S901 to S908 are the same as those in steps S101 to S108 shown in FIG. 10.

The non-associated pixel removal unit 230 removes the SAR pixel group not associated with the object from the SAR image (step S909). After the removal, the image analysis device 108 ends the SAR pixel association process.

[Description of Effects]

The image analysis device 108 of the present exemplary embodiment can prevent SAR pixels from being erroneously associated with the object. For example, when, for instance, old map data is inputted as geospatial information, observation results of objects that do not exist on the map may be recorded in the SAR image.

The non-associated pixel removal unit 230 removes, from the SAR image, the SAR pixel in which the object not existing on the map is recorded, thereby preventing the pixel classification unit 130 from forcibly associating the object with the SAR pixel on the basis of the same SAR image.

The image analysis device of each exemplary embodiment can associate each pixel of the SAR image with an object indicated by geospatial information such as a map. The image analysis device of each exemplary embodiment can assign information obtained for each pixel of the SAR image by analyzing the SAR image to an object such as a building or a road indicated by geospatial information such as a map.

In addition to the SAR image, the image analysis device of each exemplary embodiment can associate a plurality of images having phases with an object. For example, the image analysis device can associate the information of the synthetic aperture sonar with the optical image information. The image analysis device can also associate the optical image with the phase image photographed by the Time Of Flight camera.

The image analysis device of each exemplary embodiment is also applied to the field of phase imaging in which coherent light interference is utilized. For example, the image analysis device can associate the state of the phase change indicated by the phase image with the design drawing in which the configuration of the light-transmissive object is described, with respect to the combined object of the light-transmissive object in which the phase changes in transmission due to expansion or contraction, for example.

The image analysis device of each exemplary embodiment can also use data acquired using a ground-based radar. For example, there is a technique for measuring deterioration by measuring a phase change of an electromagnetic wave irradiated by a radar toward a bridge pier or a dam. The image analysis device of each exemplary embodiment can associate each portion of the bridge pier and the dam with data obtained by measuring the deterioration.

Figure 33:
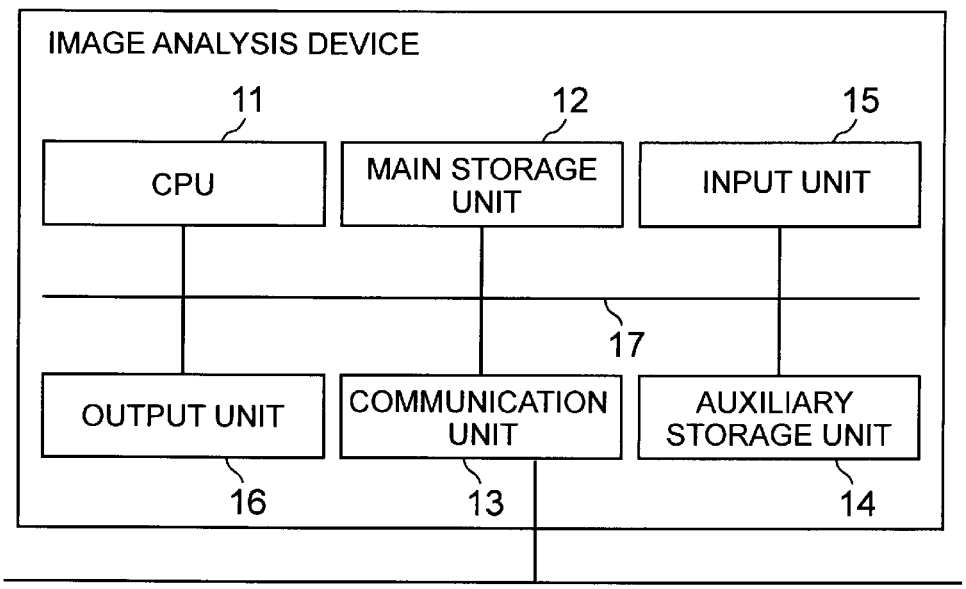
FIG. 33 is an explanatory diagram showing a hardware configuration example of an image analysis device according to the present invention.

A specific example of a hardware configuration of the image analysis device of the present exemplary embodiment will be described below. FIG. 33 is an explanatory diagram showing a hardware configuration example of the image analysis device according to the present invention.

The image analysis device shown in FIG. 33 includes a CPU (Central Processing Unit) 11, a main storage unit 12, a communication unit 13, and an auxiliary storage unit 14. The image analysis device may also include an input unit 15 for the user to operate and an output unit 16 for presenting the processing result or the progress of the processing contents to the user.

Note that the image analysis device shown in FIG. 33 may include a DSP (Digital Signal Processor) instead of the CPU 11. The image analysis device shown in FIG. 33 may also include the CPU 11 and the DSP.

The main storage unit 12 is used as a work area for data or a temporary area for data. The main storage unit 12 is, for example, a RAM (Random Access Memory).

The communication unit 13 has a function of inputting and outputting data to and from peripheral devices via a wired network or a wireless network (information communication network).

The auxiliary storage unit 14 is a tangible storage medium that is not temporary. Examples of tangible non-temporary storage media include magnetic disks, magneto-optical disks, CD-ROMs (Compact Disk Read Only Memory), DVD-ROMs (Digital Versatile Disk Read Only Memory), and semiconductor memories.

The input unit 15 has a function of inputting data and processing instructions. The input unit 15 is an input device such as a keyboard or a mouse.

The output unit 16 has a function of outputting data. The output unit 16 is, for example, a display device such as a liquid crystal display device or a printing device such as a printer.

As shown in FIG. 33, in the image analysis device, each of the components is connected to a system bus 17.

The auxiliary storage unit 14 stores, for example, programs for implementing the SAR image shaping unit 110, the geospatial information shaping unit 120, the pixel classification unit 130, the phase correlation determination unit 140, the shape determination unit 150, the image analysis unit 160, the integration unit 170, the distance determination unit 180, the stable reflection point extraction unit 190, the search range limitation unit 200, the SAR image photographing condition input unit 210, the reflection characteristic estimation unit 220, and the non-associated pixel removal unit 230.

Note that each of the image analysis devices may be implemented by hardware. For example, the image analysis device 100 may be provided with a circuit including hardware components such as an LSI (Large Scale Integration) in which a program for implementing a function as shown in FIG. 2 is incorporated.

Further, each of the image analysis devices may be implemented by software by the CPU 11 shown in FIG. 33 executing a program for providing functions of the components.

When implemented by software, each function is implemented by software by the CPU 11 loading and executing a program stored in the auxiliary storage unit 14 into the main storage unit 12 and controlling the operation of the image analysis device.

Some or all of the components may be implemented by a general purpose circuit (circuitry), a dedicated circuit, a processor, or any combination thereof. These components may be composed of a single chip or a plurality of chips connected via a bus. Some or all of the components may be implemented by a combination of, for example, the above-described circuit and program.

When some or all of the components are implemented by, for example, a plurality of information processing devices or circuits, the plurality of information processing devices or circuits may be centralized or distributed. For example, the information processing device or circuit may be implemented as a client and server system or a cloud computing system, each component of which is connected via a communication network.

Figure 34:
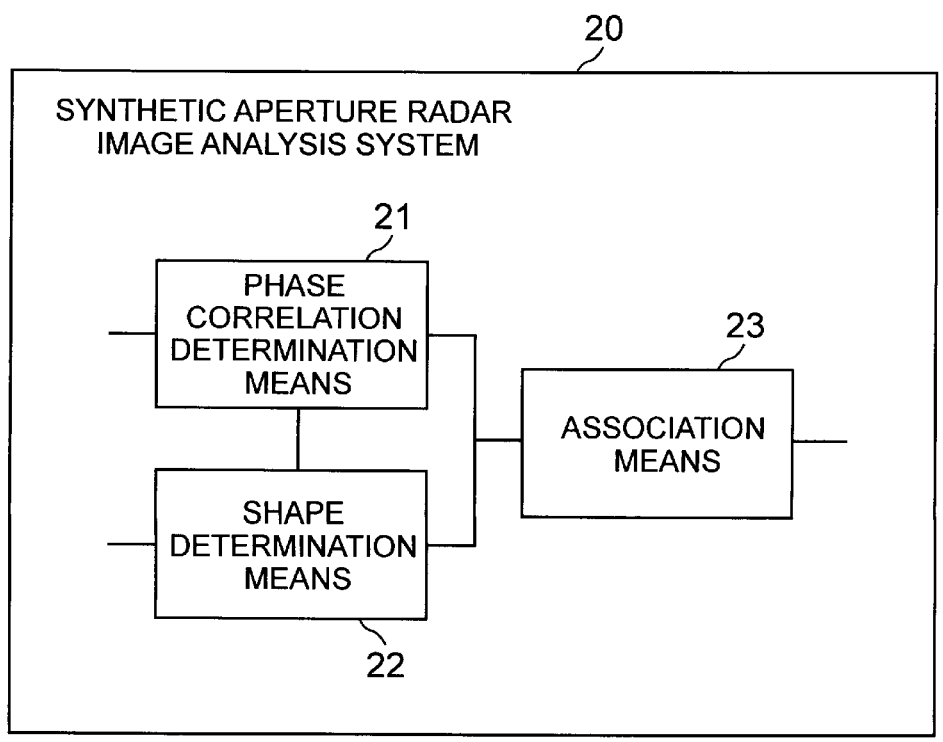
FIG. 34 is a block diagram showing the outline of a synthetic aperture radar image analysis system according to the present invention.

The outline of the present invention will now be described. FIG. 34 is a block diagram showing the outline of a synthetic aperture radar image analysis system according to the present invention. A synthetic aperture radar image analysis system 20 includes: a phase correlation determination means 21 (for example, the phase correlation determination unit 140) which determines a strength of the phase correlation between a plurality of pixels in an image selected from among a plurality of images on the basis of the plurality of images that have been photographed by a synthetic aperture radar and show the same point; a shape determination means 22 (for example, the shape determination unit 150) which determines a degree of similarity between the shape of the distribution of the plurality of pixels and an object shape indicated by geospatial information; and an association means 23 (for example, the pixel classification unit 130) which associates the plurality of pixels with the object on the basis of the determined strength of the phase correlation and the determined degree of similarity.

The shape determination means 22 may also determine the degree of similarity between the shapes of the distributions of the plurality of pixels determined that the strength of phase correlation is greater than or equal to a first predetermined value and the object shapes indicated by geospatial information. The association means 23 may also associate an object with a plurality of pixels whose similarity degree is determined to be greater than or equal to a second predetermined value.

Such a configuration allows the synthetic aperture radar image analysis system to easily associate pixels of a SAR image with an object indicated by geospatial information. The synthetic aperture radar image analysis system 20 is a system for associating a SAR pixel group with an object indicated by geospatial information.

The synthetic aperture radar image analysis system 20 may also include a specification means (for example, the search range limitation unit 200) which specifies a range in which the object associated with the plurality of pixels is searched out of the range indicated by the geospatial information, and the shape determination means 22 may determine the object existing in the specified range as an object to be determined.

The specification means may specify the range to be searched on the basis of the conversion relation between the coordinates of the geospatial information and the coordinates of the SAR image.

Such a configuration allows the synthetic aperture radar image analysis system to more quickly associate the pixels of the SAR image with the object.

The synthetic aperture radar image analysis system 20 may also include an estimation means (for example, the reflection characteristic estimation unit 220) which estimates an intensity at which the object indicated by the geospatial information reflects electromagnetic waves, and the shape determination means 22 may determine a degree of similarity on the basis of the estimated intensity.

Such a configuration allows the synthetic aperture radar image analysis system to more accurately associate the pixels of the SAR image with the object.

The synthetic aperture radar image analysis system 20 may also include a distance determination means (for example, the distance determination unit 180) which determines a distance between pixels, and the shape determination means 22 may determine a plurality of pixels determined that the distance between the pixels is less than or equal to a predetermined value as an object to be determined.

Such a configuration allows the synthetic aperture radar image analysis system to more accurately associate the pixels of the SAR image with the object.

The synthetic aperture radar image analysis system 20 may also include an extraction means (for example, the stable reflection point extraction unit 190) which extracts stable reflection points from the plurality of images showing the same point, and the phase correlation determination means 21 may determine a strength of the phase correlation between the extracted stable reflection points.

Such a configuration allows the synthetic aperture radar image analysis system to associate the stable reflection point of the SAR image with the object.

The phase correlation determination means 21 may also divide a pixel group of the image selected on the basis of the determined strength of the phase correlation, and the shape determination means 22 may determine a degree of similarity between the shape of the distribution of the divided pixel group and the object shape.

Such a configuration allows the synthetic aperture radar image analysis system to associate the pixels of the SAR image with the object by using a clustering method.

In addition, the phase correlation determination means 21 may repeatedly execute the division until the result of associating the divided pixel group with the object satisfies a predetermined condition.

Such a configuration allows the synthetic aperture radar image analysis system to more precisely associate the pixels of the SAR image with the object.

The synthetic aperture radar image analysis system 20 may also include an analysis means (for example, the image analysis unit 160) which analyzes a plurality of images photographed by the synthetic aperture radar, and an integration means (for example, the integration unit 170) which integrates the result of the analysis by the analysis means into the result in which the plurality of pixels and the object are associated with each other.

Such a configuration allows the synthetic aperture radar image analysis system to present the information obtained by the SAR image analysis to the user.

The synthetic aperture radar image analysis system 20 may also include a removal means (for example, the non-associated pixel removal unit 230) which removes pixels that are not associated with the object from the selected image.

Such a configuration allows the synthetic aperture radar image analysis system to more precisely associate the pixels of the SAR image with the object.

Although the present invention has been described with reference to the exemplary embodiments and examples, the present invention is not limited to the exemplary embodiments and examples. The configurations and details of the present invention may be modified in various ways as will be understood by those skilled in the art within the scope of the present invention.

REFERENCE SIGNS LIST 10, 20 Synthetic aperture radar image analysis system
11 CPU
12 Main storage unit
13 Communication unit
14 Auxiliary storage unit
15 Input unit
16 Output unit
17 System bus
21 Phase correlation determination means
22 Shape determination means
23 Association means
100 to 108 Image analysis device
110 SAR image shaping unit
120 Geospatial information shaping unit
130 Pixel classification unit 131 Division unit
132 Search unit
133 End determination unit
140 Phase correlation determination unit
150 Shape determination unit
160 Image analysis unit
170 Integration unit
180 Distance determination unit
190 Stable reflection point extraction unit
200 Search range limitation unit
210 SAR image photographing condition input unit
220 Reflection characteristic estimation unit
230 Non-associated pixel removal unit
300 SAR image storage device
400 Input interface
500 Geospatial information storage device
600 SAR image photographing apparatus
900 SAR image analysis unit
910 Stable reflection point computation unit
920 Displacement/elevation computation unit

What is claimed is:

1. A synthetic aperture radar image analysis system comprising:
a memory configured to store instructions; and
a processor configured to execute the instructions to:
determine a strength of a phase correlation between a plurality of pixels in an image selected from among a plurality of images on the basis of the plurality of images that have been photographed by a synthetic aperture radar and show the same point;
determine a degree of similarity between the shape of the distribution of the plurality of pixels and an object shape indicated by geospatial information; and
associate the plurality of pixels with the object on the basis of the determined strength of the phase correlation and the determined degree of similarity.

2. The synthetic aperture radar image analysis system according to claim 1, wherein the processor is further configured to execute the instructions to:
specify a range in which the object associated with the plurality of pixels is searched out of the range indicated by the geospatial information; and
determine the object existing in the specified range as an object to be determined.

3. The synthetic aperture radar image analysis system according to claim 2, wherein the processor is further configured to execute the instructions to:
estimate an intensity at which the object indicated by the geospatial information reflects electromagnetic waves; and
determine a degree of similarity on the basis of the estimated intensity.

4. The synthetic aperture radar image analysis system according to claim 3, wherein the processor is further configured to execute the instructions to:
determine a distance between pixels; and
determine a plurality of pixels for which the distance between the pixels is determined to be less than or equal to a predetermined value as an object to be determined.

5. The synthetic aperture radar image analysis system according to claim 2, wherein the processor is further configured to execute the instructions to:
determine a distance between pixels; and
determine a plurality of pixels for which the distance between the pixels is determined to be less than or equal to a predetermined value as an object to be determined.

6. The synthetic aperture radar image analysis system according to claim 2, wherein the processor is further configured to execute the instructions to:
extract stable reflection points from the plurality of images showing the same point; and
determine a strength of the phase correlation between the extracted stable reflection points.

7. The synthetic aperture radar image analysis system according to claim 2, wherein the processor is further configured to execute the instructions to:
specify the range to be searched on the basis of the conversion relation between the coordinates of the geospatial information and the coordinates of the SAR image.

8. The synthetic aperture radar image analysis system according to claim 1, wherein the processor is further configured to execute the instructions to:
estimate an intensity at which the object indicated by the geospatial information reflects electromagnetic waves; and
determine a degree of similarity on the basis of the estimated intensity.

9. The synthetic aperture radar image analysis system according to claim 8, wherein the processor is further configured to execute the instructions to:
determine a distance between pixels; and
determine a plurality of pixels for which the distance between the pixels is determined to be less than or equal to a predetermined value as an object to be determined.

10. The synthetic aperture radar image analysis system according to claim 8, wherein the processor is further configured to execute the instructions to:
extract stable reflection points from the plurality of images showing the same point; and
determine a strength of the phase correlation between the extracted stable reflection points.

11. The synthetic aperture radar image analysis system according to claim 1, wherein the processor is further configured to execute the instructions to:
determine a distance between pixels; and
determine a plurality of pixels for which the distance between the pixels is determined to be less than or equal to a predetermined value as an object to be determined.

12. The synthetic aperture radar image analysis system according to claim 1, wherein the processor is further configured to execute the instructions to:
extract stable reflection points from the plurality of images showing the same point,
determine a strength of the phase correlation between the extracted stable reflection points.

13. The synthetic aperture radar image analysis system according to claim 1, wherein the processor is further configured to execute the instructions to:
divide a pixel group of the image selected on the basis of the determined strength of the phase correlation, and determine a degree of similarity between the shape of the distribution of the divided pixel group and the object shape.

14. The synthetic aperture radar image analysis system according to claim 13, wherein the processor is further configured to execute the instructions to:
repeatedly execute the division until the result of associating the divided pixel group with the object satisfies a predetermined condition.

15. The synthetic aperture radar image analysis system according to claim 1, wherein the processor is further configured to execute the instructions to:
analyze a plurality of images photographed by the synthetic aperture radar; and
integrate the result of the analysis by the analysis unit into the result in which the plurality of pixels and the object are associated with each other.

16. The synthetic aperture radar image analysis system according to claim 1, wherein the processor is further configured to execute the instructions to:
determine the degree of similarity between the shapes of the distributions of the plurality of pixels for which the strength of phase correlation is determined to be greater than or equal to a first predetermined value and the object shapes indicated by geospatial information.

17. The synthetic aperture radar image analysis system according to claim 1, wherein the processor is further configured to execute the instructions to:
associate an object with a plurality of pixels whose similarity degree is determined to be greater than or equal to a second predetermined value.

18. The synthetic aperture radar image analysis system according to claim 1, wherein the processor is further configured to execute the instructions to:
remove pixels that are not associated with the object from the selected image.

19. A synthetic aperture radar image analysis method comprising:
determining a strength of a phase correlation between a plurality of pixels in an image selected from among a plurality of images on the basis of the plurality of images that have been photographed by a synthetic aperture radar and show the same point;
determining a degree of similarity between the shape of the distribution of the plurality of pixels and an object shape indicated by geospatial information; and
associating the plurality of pixels with the object on the basis of the determined strength of the phase correlation and the determined degree of similarity.

20. A non-transitory computer-readable capturing medium having captured therein a synthetic aperture radar image analysis program for causing a computer to execute:
a phase correlation determination process of determining a strength of a phase correlation between a plurality of pixels in an image selected from among a plurality of images on the basis of the plurality of images that have been photographed by a synthetic aperture radar and show the same point;
a shape determination process of determining a degree of similarity between the shape of the distribution of the plurality of pixels and an object shape indicated by geospatial information; and
an association process of associating the plurality of pixels with the object on the basis of the determined strength of the phase correlation and the determined degree of similarity.

* * * * *